United States Patent
Nelson et al.

(10) Patent No.: US 10,365,671 B1
(45) Date of Patent: *Jul. 30, 2019

(54) SENSOR WINDOW HEATING APPARATUS

(71) Applicant: AMAZON TECHNOLOGIES, INC., Seattle, WA (US)

(72) Inventors: John Nelson, Redmond, WA (US); Heather Anne Ralph, Seattle, WA (US); Matthew David Mickelson, Seattle, WA (US); Brad Nathaniel Arnold, Bellevue, WA (US); Matthew Christopher Smith, Seattle, WA (US); Daniel Joseph Peters, Lynwood, WA (US); Kevin Bailey, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 474 days.

This patent is subject to a terminal disclaimer.

(21) Appl. No.: 14/751,033

(22) Filed: Jun. 25, 2015

(51) Int. Cl.
 *G05B 15/02* (2006.01)
 *G05D 23/19* (2006.01)
 *G06Q 10/08* (2012.01)

(52) U.S. Cl.
 CPC ......... *G05D 23/1917* (2013.01); *G05B 15/02* (2013.01); *G06Q 10/087* (2013.01)

(58) Field of Classification Search
 CPC .......... G05D 23/1913; G05D 23/1917; G05D 23/24; G05B 15/02
 USPC ............................................. 700/90; 219/200
 See application file for complete search history.

(56) References Cited

U.S. PATENT DOCUMENTS

| | | | |
|---|---|---|---|
| 4,357,524 A | 11/1982 | Apfelbeck et al. | |
| 5,399,435 A | 3/1995 | Ando et al. | |
| 6,734,396 B2* | 5/2004 | Sol | B32B 17/10036 219/203 |
| 7,225,980 B2 | 6/2007 | Ku et al. | |
| 7,684,545 B2* | 3/2010 | Damento | G01T 1/20 250/370.11 |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,235,928 B2 | 1/2016 | Medioni et al. | |
| 2006/0171704 A1* | 8/2006 | Bingle | B60R 11/04 396/419 |
| 2011/0011936 A1 | 1/2011 | Morandi et al. | |

(Continued)

OTHER PUBLICATIONS

Fuqua, Shawntina T., "Non-Final Office Action dated Jun. 19, 2017", U.S. Appl. No. 14/751,012, The United States Patent and Trademark Office, dated Jun. 19, 2017.

(Continued)

*Primary Examiner* — Chun Cao
(74) *Attorney, Agent, or Firm* — Lindauer Law, PLLC

(57) ABSTRACT

During operation, a facility may utilize many sensors, such as cameras, to generate sensor data. Some of these sensors may be housed within protective enclosures. The enclosures may be inside specially controlled environments, such as refrigerators, freezers, and so forth. During operation of the facility, moisture may accumulate on these enclosures, impairing the ability of the camera to acquire an image through the window. Described are devices to selectively heat a viewable area of the window such that moisture accumulation is reduced with minimal power use.

21 Claims, 17 Drawing Sheets

(56) References Cited

U.S. PATENT DOCUMENTS

| | | | |
|---|---|---|---|
| 2011/0249120 A1* | 10/2011 | Bingle | B60R 11/04 |
| | | | 348/148 |
| 2012/0284132 A1 | 11/2012 | Kim et al. | |
| 2013/0284806 A1 | 10/2013 | Margalit | |
| 2016/0123657 A1* | 5/2016 | Kim | F25D 29/00 |
| | | | 62/125 |

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Lockheed, "A Service Publication of Lockheed Aeronautical Systems Company-Georgia", vol. 15, No. 1, (Charles I. Gale, ed., Jan.-Mar. 1988). Retrieved from Internet: <http://www.lockheedmartin.com/content/dam/lockheed/data/aero/documents/global-sustainment/product-support/Service-News/V15N1.pdf>.

Pop, Cristian, "Introduction to the BodyCom Technology", AN1391, DS01391A, Microchip Technology, Inc., May 2, 2011.

Saint-Gobain Sully, "Technologies Heating Systems", [retrieved on Jun. 24, 2015]. Retrieved from Internet: <http://www.saint-gobain-sully.com/aerospace_technologies_heating_systems.php>.

* cited by examiner

SENSOR WINDOW HEATING APPARATUS

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping area or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
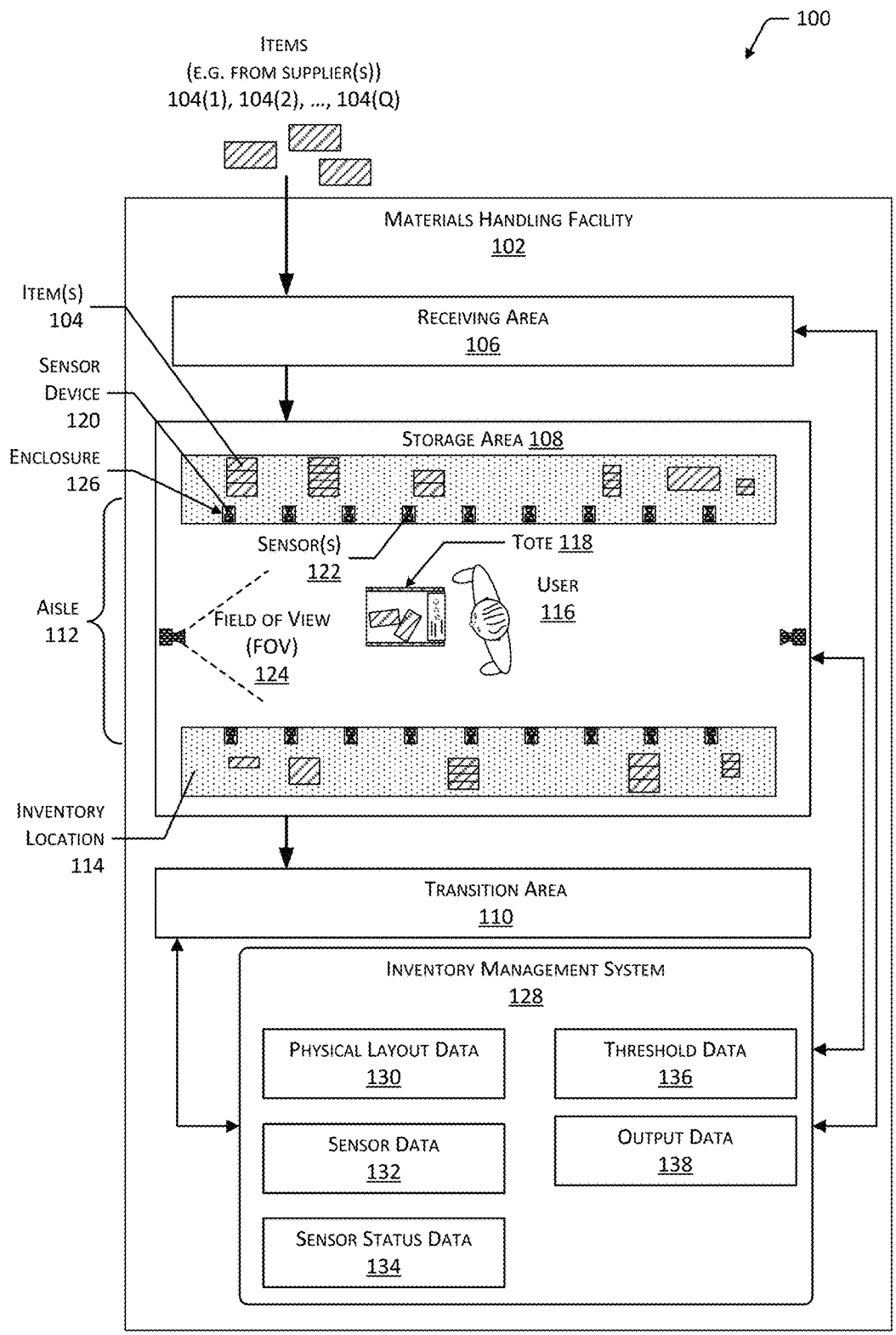
FIG. 1 is a block diagram illustrating a materials handling facility (facility) configured to use sensor devices with enclosures having a heated window to prevent moisture accumulation, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The figures are not necessarily to scale. The elements in the figures are not necessarily proportionate to one another. The size, proportion, or size and proportion of some elements relative to one another may be exaggerated.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes systems and techniques for providing a heated window through which a sensor of a sensor device within an enclosure may have a field of view to acquire sensor data that is unimpeded by accumulated moisture. For example, the enclosure may be located within a refrigerated area within which an unheated window may be subject to accumulation of condensation, frost, and so forth. In another example, windows may be provided into the refrigerated area, such that sensors may be mounted outside of the refrigerated area, looking in.

A materials handling facility (facility) or other setting may utilize sensor data acquired from sensor devices. The facility may include, or have access to, an inventory management system. The inventory management system may be configured to maintain information about items, users, condition of the facility, and so forth. For example, the inventory management system may maintain data indicative of what items a particular user is ordered to pick, location of the particular user, quantity of an item picked by a user, requests for assistance, environmental status of the facility, and so forth. The inventory management system, or another system, may generate this data based on the sensor data, such as images acquired from imaging sensors such as cameras. For example, the images may be used to identify an object such as a user or item, track the object, and so forth.

The various sensors and computer systems described herein may collect a wide variety of data relating to users of systems or facilities employing such sensors or computer systems. The data relating to users may include, for example, images, video, location information, travel patterns, personal identification information, transaction history information, user preferences, and the like. The sensors, systems, and techniques described herein would be typically configured to process this information in a manner that ensures compliance with all appropriate laws, regulations, standards, and the like.

The sensor devices may include one or more sensors, such as imaging sensors, three-dimensional (3D) sensors, and so forth. The sensor devices may be located at different places within the facility to acquire sensor data suitable for particular uses. The sensor data may comprise still images, video, depth data, and so forth. For example, sensor devices that include imaging sensors may be used to acquire images that are processed to identify a user. Some sensors may have a field of view (FOV) that encompasses a region at the facility, such as a volume in an aisle, a portion of a shelf, and so forth. In some implementations, the sensor devices may have different optical or electronic characteristics based at least in part on the intended usage. For example, some sensor devices may be equipped with imaging sensors including lenses to acquire close-up images, while others are equipped to acquire images from farther away.

Other sensors may have an area in which they are able to sense or detect input, such as a weight sensor under a particular portion of a floor, an instrumented auto-facing unit providing information about a quantity of items on a shelf, and so forth.

The facility may implement any number of sensor devices to support operation. For example, hundreds or thousands of sensor devices may be mounted within the facility to gather information about items as they are added or removed from inventory locations by users, provide information about the location and identity of users in the facility, and so forth.

Some of the items stowed at the facility may require special environmental conditions, such as temperatures below a particular temperature. For example, refrigerated cases, walk in freezers, and so forth may be used to maintain perishable items, frozen items, and so forth, to within a desired temperature range. One or more sensor devices and their associated one or more sensors may be located within an enclosure. The enclosure may provide protection from the ambient environmental conditions. For example, the enclosure may protect the sensor device from moisture, temperature, contaminants, and so forth. The enclosure may include a heated window that has a viewable area that is heated to prevent accumulation of moisture. The viewable area is a portion of the heated window through which the FOV of a sensor is able to "see" or "look through".

The heated window may include one or more heater elements that dissipate electrical energy as heat to raise the temperature of at least a portion of the viewable area. The raised temperature may prevent the accumulation of moisture, evaporate liquid water, melt ice, and so forth. In some implementations, the temperature within the viewable area may be below or above a dewpoint of the ambient environment.

By positioning the sensor close to the heated window, a size of the viewable area may be reduced compared to the size of a viewable area where the sensor is farther away. The viewable area includes one or more heater elements. At least a portion of the one or more heater elements are thus within the FOV of the sensor. The heater elements may include one or more of a transparent conducting film or wire. When electrical current is passed through the heater element, the electrical resistance of the heater element converts the electrical energy into heat. The heat is then transferred from the heater element to a substrate. A window heater power cable supplies the electricity from a heater controller or power source to the heater element.

The heater element may comprise one or more of at least one area of transparent conducting film on the substrate or at least one wire arranged in a pattern on or within the substrate. The transparent conducting film is substantially transparent to the wavelengths utilized by the sensor. For example, the transparent conducting film may comprise indium tin oxide (ITO) that is more than 70% transmissive to light between 400 and 700 nanometers. In implementations utilizing the wire, the size of the wire, adjacent spacing, and so forth may be adjusted to reduce or eliminate interference with the FOV of the sensor. For example, the wires may have a diameter of less than 30 microns and be configured such that there is at least 200 microns between adjacent portions of the same wire.

In some implementations, the heater elements may be configured to deliver heat non-uniformly to the viewable area of the heated window. For example, the amount of heat delivered to a center of the viewable area may be less than that delivered to an edge of the viewable area. This non-uniform delivery may enable a reduction in the amount of energy required to keep the viewable area clear of moisture, compared to uniform delivery. The perimeter of the heated window may be mounted to the enclosure or another structure. Due to the physical contact of this mounting, thermal conduction occurs between the perimeter of the heated window and the structure of the enclosure. Heat delivered to the center of the viewable area is conducted to the edges, and then may be transferred by conduction to the enclosure. Because of the conductive path to the enclosure, heat may be more quickly dissipated or transferred from the perimeter of the heated window than the center of the viewable area. As a result, if the heater of the heater element delivers heat uniformly, a central area of the viewable area may be at a higher temperature than the area around the edges. In such a situation, excess energy may be applied to the heater element(s) to bring the edges of the viewable area up to the desired temperature. For example, energy may be dissipated uniformly and result in the central area of the viewable area having a temperature that is 5 degrees Celsius greater than the temperature at a corner.

Non-uniform delivery of heat may be accomplished using a variety of techniques or structures. One technique may include a shaped transparent heater element that widens from a relatively narrow neck at one end to a relatively wide portion in the middle. The area of the neck thus dissipates a larger amount of heat energy per unit area than the wide portion. Another technique may be to vary the thickness of the heater element. For example, a thickness of a portion of a transparent heater element may be increased to reduce electrical resistance within that portion, lowering the amount of electrical energy dissipated as heat due to the electrical resistance. Yet another technique is to vary a density of wire within a particular area, such as increasing a number of loops of a wire per unit area to increase the amount of energy dissipated per unit area. Still another technique may allow for differential application of electrical energy to different heater elements. For example, more current may be supplied to a heater element proximate to the perimeter than the heater element in the center of the viewable area.

The electrical energy may be delivered to one or more heater elements by a heater controller. The heater controller may comprise one or more of current regulator circuitry, voltage regulator circuitry, or other circuitry to deliver a predetermined amount of electrical energy to the one or more heater elements. In some implementations, the heater controller may dynamically adjust the amount of electrical energy delivered to the one or more heater elements responsive to input. For example, a thermometer or other temperature sensing device may be used to measure ambient air temperature of an exterior environment, temperature of a portion of the heated window, and so forth. Based on the sensor data indicative of temperature, the amount of electrical energy delivered to the heater element may change. For example, as the temperature exterior to the enclosure decreases, additional electrical energy may be provided to the one or more heater elements. Likewise, if the temperature of the heated window reaches a particular value, the quantity of electrical energy provided to the one or more heater elements may be reduced.

The heater elements and components such as bus bars, temperature sensors, and so forth may be positioned on an interior side of the heated window. For example, the heater elements may be located on the surface of the heated window that is interior to the enclosure. This positioning avoids the need to penetrate the enclosure, improving the seal integrity and simplifying the design of the enclosure.

Heating the heated window provides a window clear of accumulated moisture, through which the sensor may acquire sensor data under environmental conditions that would otherwise obscure the FOV of the sensor or result in degraded sensor data. The inventory management system may then utilize this sensor data for operation.

By heating the viewable area of the heated window, energy consumption may be decreased compared to heating the entire heated window. Additional reductions in energy consumption may be realized by delivering heat energy in a spatially non-uniform fashion. For example, some areas of a substrate receive more heat energy per unit area than others due to a change in shape, composition, and so forth of the heater element. By reducing the energy consumed, the overall amount of energy dissipated is also reduced. For example, by reducing the amount of energy dissipated as heat by the heated windows that are used in a refrigerated area, the cooling load on a refrigeration system that cools the refrigerated area is reduced. This improves overall energy efficiency of the facility.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114(1), 114(2), . . . , 114(L) may include one or more of shelves, racks, cases, cabinets, bins, floor locations, slatwalls, pegboards, trays, dispensers, or other suitable storage mechanisms. The inventory locations 114 may be affixed to the floor or another portion of the facility's 102 structure. In some implementations, the inventory locations 114 may be refrigerated or placed within a refrigerated enclosure or area. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another. Continuing the example, the inventory location 114 may move from one aisle 112 to another, from one location within an aisle 112 to another, and so forth. In another example, the inventory locations 114 may be configured to translate, rotate, or otherwise move relative to the facility 102.

One or more users 116(1), 116(2), . . . , 116(U) and totes 118(1), 118(2), . . . , 118(T), or other material handling apparatuses, may move within the facility 102. For example, the user 116 may be an employee who moves about within the facility 102 to pick or place the items 104 in various inventory locations 114, placing them on the tote 118 for ease of transport. The tote 118 is configured to carry or otherwise transport one or more items 104. For example, the totes 118 may include carts, baskets, bags, bins, and so forth. In some implementations, the tote 118 may incorporate one or more inventory locations 114. For example, the tote 118 may include a bin, basket, shelf, and so forth.

Instead of, or in addition to the users 116, other mechanisms such as robots, forklifts, cranes, aerial drones, conveyors, elevators, pipes, and so forth, may move items 104 about the facility 102. For example, a robot may pick the item 104 from a first inventory location 114(1) and move the item 104 to a second inventory location 114(2).

The facility 102 may employ sensor devices 120, with each sensor device 120 having one or more sensors 122. The sensors 122 may be supported by, coupled to, or incorporated within, the sensor device 120. The sensor device 120 may comprise a computing device, one or more sensors 122, and so forth. The sensor device 120 is described in more detail below with regard to FIG. 4.

The one or more sensors 122 may be configured to acquire information in the facility 102. The sensors 122 may include, but are not limited to, imaging sensors, weight sensors, proximity sensors, radio frequency (RF) receivers, microphones, temperature sensors, humidity sensors, vibration sensors, and so forth. The sensors 122 may be stationary or mobile, relative to the facility 102. For example, the inventory locations 114, the totes 118, or other devices such as user devices may contain sensors 122 to acquire sensor data. The sensors 122 are discussed in more detail below with regard to FIG. 2. Some sensors may have a field of view (FOV) 124 that encompasses a region at the facility 102, such as a volume in an aisle 112, a portion of an inventory location 114, and so forth.

One or more of the sensor device 120 or the sensor 122 may be protected from ambient environmental conditions by an enclosure 126. The enclosure 126 may define an enclosed volume having an interior and an exterior. The sensor device 120 and the one or more sensors 122 may be within the interior. A heated window as described below may be provided, through which the FOV 124 of the sensor 122 may "look".

While the storage area 108 is depicted as having one or more aisles 112, inventory locations 114 storing the items 104, sensors 122, and so forth, it is understood that the receiving area 106, the transition area 110, or other areas of the facility 102 may be similarly equipped. Furthermore, the arrangement of the various areas within the facility 102 is depicted functionally rather than schematically. In some implementations, multiple different receiving areas 106, storage areas 108, and transition areas 110 may be interspersed rather than segregated.

Portions of the facility 102 may be climate controlled to provide particular conditions suitable for the storage of items 104 therein. For example, a portion of the storage area 108 may be enclosed and refrigerated to below freezing temperatures to keep frozen items 104 stored therein frozen.

The facility 102 may include, or be coupled to, an inventory management system 128. The inventory management system 128 is configured to interact with users 116 or devices such as sensors 122, robots, material handling equipment, computing devices, and so forth, in one or more of the receiving area 106, the storage area 108, or the transition area 110.

The facility 102 may be configured to receive different kinds of items 104 from various suppliers, and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of item 104, depending on the nature of the enterprise that operates the facility 102.

Upon being received from a supplier at the receiving area 106, the items 104 may be prepared for storage. For example, items 104 may be unpacked or otherwise rearranged. The inventory management system 128 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable, individual units or multiples, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. In one implementation, a user 116 may have a list of items 104 they desire and may progress through the facility 102 picking items 104 from inventory locations 114 within the storage area 108 and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the item 104 may be transitioned from the storage area 108 to the packing station. Information about the transition may be maintained by the inventory management system 128.

In another example, if the items 104 are departing the facility 102, a list of the items 104 may be obtained and used by the inventory management system 128 to transition responsibility for, or custody of, the items 104 from the facility 102 to another entity. For example, a carrier may accept the items 104 for transport with that carrier accepting responsibility for the items 104 indicated in the list. In another example, a customer may purchase or rent the items 104 and remove the items 104 from the facility 102.

During operation, the inventory management system 128 may access one or more of physical layout data 130, sensor data 132, sensor status data 134, or threshold data 136. The physical layout data 130 comprises information about the physical configuration of the facility 102 or portions thereof. For example, the physical layout data 130 may include electronic representations of the physical structures in the facility 102, such as computer aided design (CAD) data of the aisle 112 configurations, inventory locations 114, information about which items 104 are in what inventory locations 114, real coordinates of the sensor devices 120, orientation of the FOV 124 of the sensor devices 120, temperatures to maintain a refrigerated area at, and so forth. The physical layout data 130 may include information about the presence of walls; heating, ventilation, and air conditioning (HVAC) equipment; refrigerated areas, location of doors and windows; and so forth.

In some implementations, the physical layout data 130 may indicate a location or position of a sensor device 120 with respect to another device or fixture in the facility 102. For example, the physical layout data 130 may indicate that the sensor device 120(1) is located within a particular freezer case.

The sensor data 132 may comprise information acquired from, or based on, the one or more sensors 122. For example, the sensor data 132 may comprise 3D information about an object in the facility 102 as acquired by the 3D sensors 122(2) or weight data as acquired by the weight sensors 122(6). In some implementations, sensor data 132 may include metadata such as information about imaging sensor settings used to acquire image data, filename, and so forth. The metadata associated with the sensor data 132 may be particularly associated with the acquisition of that sensor data 132. For example, the metadata may include a timestamp comprising time information indicative of the acquisition of the sensor data 132. The timestamp may be generated using time data from an internal clock of the sensor device 120. For example, the timestamp may comprise date and time information as obtained from the clock of the sensor device 120.

In comparison, sensor status data 134 is indicative of operation of the sensor device 120, or the components thereof, as distinct from the output of the sensor 122 itself that generates sensor data 132. The sensor device 120 may include onboard circuitry, software, and so forth, to generate the sensor status data 134. For example, the sensor status data 134 may indicate one or more of temperature of the electronics associated with the sensor device 120, temperature of the heated window, temperature external to the enclosure 126, relative humidity within the sensor device 120, processor load, memory usage, direction or orientation of the FOV 124, available power, network status, and so forth.

The threshold data 136 may specify temperature ranges at which energy is to be provided to the heated window. For example, the threshold data 136 may comprise a lookup table specifying a range of temperatures and relative humidity within which heating of the heated window is to take place.

The inventory management system 128 is configured to generate output data 138 based at least in part on the sensor data 132. The output data 138 may comprise information about occurrences or activities within the facility 102, status of objects within the facility 102, and so forth. For example, the inventory management system 128 may generate output data 138 indicative of a location of an object such as the user 116, the tote 118, an item 104, and so forth, based at least in part on the sensor data 132. In another example, the output data 138 may comprise information indicative of a quantity of items 104 picked or placed from the inventory locations 114, quantity of items 104 present at the inventory location 114 at a particular point in time, and so forth.

By using the heated windows as described herein, sensor data 132 may be provided to the inventory management system 128 that is not degraded by moisture in the FOV 124 of the sensor 122. The inventory management system 128 may acquire and utilize the sensor data 132 to generate output data 138 and maintain normal operation of the facility 102 even while some sensor devices 120 are located in areas prone to the collection of moisture, such as in a refrigerated environment. As a result, the facility 102 may more reliably provide a variety of services to the user 116 as well as the operator, improving the overall user experience.

Figure 2:
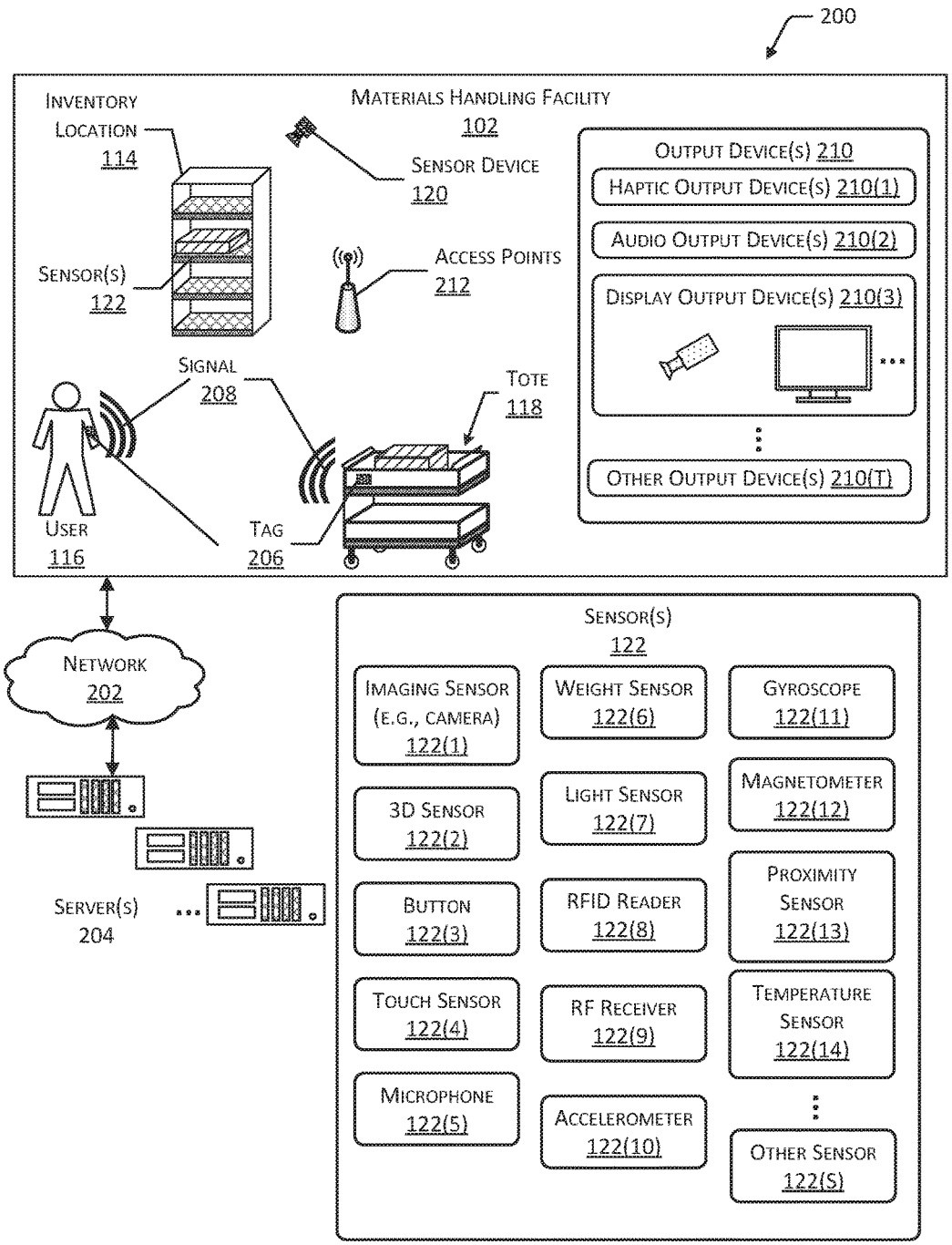
FIG. 2 is a block diagram illustrating additional details of the facility, according to some implementations.

FIG. 2 is a block diagram 200 illustrating additional details of the facility 102, according to some implementations. The facility 102 may be connected to one or more networks 202, which in turn may connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks.

The servers 204 may be configured to execute one or more modules or software applications associated with the inventory management system 128. While the servers 204 are illustrated as being in a location outside of the facility 102, in other implementations, at least a portion of the servers 204 may be located at the facility 102. The servers 204 are discussed in more detail below with regard to FIG. 3.

The facility 102 may include one or more sensor devices 120. The sensor devices 120 may communicate to the servers 204 using the network 202.

The users 116, the totes 118, or other objects in the facility 102 may be equipped with one or more tags 206. The tags 206 are configured to emit a signal 208. In one implementation, the tag 206 may be a radio frequency identification (RFID) tag 206 configured to emit a RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth Low Energy (BLE) transmitter and battery. In other implementations, the tag 206 may use other techniques to indicate presence to a corresponding sensor or detector. For example, the tag 206 may be configured to generate an ultrasonic signal 208 that is detected by corresponding acoustic receivers. In yet another implementation, the tag 206 may be configured to emit an optical signal 208.

The inventory management system 128 may be configured to use the tags 206 for one or more of identification of the object, determining a location of the object, and so forth. For example, the users 116 may wear tags 206, the totes 118 may have tags 206 affixed, and so forth, that may be read and used to determine identity and location.

Generally, the inventory management system 128 or other systems associated with the facility 102 may include any number and combination of input components, output components, and servers 204.

The one or more sensor devices 120 or the one or more sensors 122 coupled to the sensor devices 120 may be arranged at one or more locations within the facility 102. For example, the sensor devices 120 may be within one or more enclosures 126 within a refrigerated enclosure or room, and so forth.

The sensors 122 may include one or more imaging sensors 122(1). These imaging sensors 122(1) may include cameras configured to acquire images of a scene. The imaging sensors 122(1) are configured to detect light in one or more wavelengths including, but not limited to, terahertz, infrared, visible, ultraviolet, and so forth. The inventory management system 128 may use image data acquired by the imaging sensors 122(1) during operation of the facility 102. For example, the inventory management system 128 may identify items 104, users 116, totes 118, and so forth, based at least in part on their appearance within the image data.

One or more 3D sensors 122(2) may also be included in the sensors 122. The 3D sensors 122(2) are configured to acquire spatial or three-dimensional data, such as depth information, about objects within a sensor FOV 124. The 3D sensors 122(2) may include range cameras, lidar systems, sonar systems, radar systems, structured light systems, stereo vision systems, optical interferometry systems, coded aperture systems, and so forth. For example, the 3D sensor 122(2) may include a light source, a sensor, and circuitry to generate light pulses using the light source. For example, the light source may comprise one or more light emitting diodes (LEDs) and the sensor may comprise a charge coupled device (CCD), complementary metal oxide semiconductor (CMOS), photodetector, and so forth. The 3D sensor 122(2) may use the processor 404 to execute instructions to initiate emission of a light pulse from the light source and detect a return of the pulse with the sensor. Based on a time for the light pulse to be emitted and return to the sensor and given a known velocity of light, the processor may determine a distance to at least a portion of an object in the region.

The inventory management system 128 may use the three-dimensional data acquired to identify objects, determine one or more of a location, orientation, or position of an object, and so forth. For example, the output data 138 may be based on the point cloud data provided by the 3D sensor 122(2) and may include one or more of a location, orientation, position, or pose of the user 116 in three-dimensional space within the facility 102. The location may be described as where in space within the facility 102 an object is. For example, the location may be specified as X and Y coordinates relative to an origin, where X and Y are mutually orthogonal. In comparison, orientation may be indicative of a direction the object (or a portion thereof) is facing. For example, the orientation may be that the user 116 is facing south. Position may provide information indicative of a physical configuration or pose of the object, such as the arms of the user 116 are stretched out to either side. Pose may provide information on a relative configuration of one or more elements of an object. For example, the pose of the user's 116 hand may indicate whether the hand is open or closed. In another example, the pose of the user 116 may include how the user 116 is holding an item 104.

One or more buttons 122(3) may be configured to accept input from the user 116. The buttons 122(3) may comprise mechanical, capacitive, optical, or other mechanisms. For example, the buttons 122(3) may comprise mechanical switches configured to accept an applied force from a touch of the user 116 to generate an input signal. The inventory management system 128 may use data from the buttons 122(3) to receive information from the user 116. For example, the buttons 122(3) may be used to accept input from a user 116 such as a username and password associated with an account.

The sensors 122 may include one or more touch sensors 122(4). The touch sensors 122(4) may use resistive, capacitive, surface capacitance, projected capacitance, mutual capacitance, optical, Interpolating Force-Sensitive Resistance (IFSR), or other mechanisms to determine the point of a touch or near-touch. For example, the IFSR may comprise a material configured to change electrical resistance responsive to an applied force. The point of that change in electrical resistance within the material may indicate the point of the touch. The inventory management system 128 may use data from the touch sensors 122(4) to receive information from the user 116. For example, the touch sensor 122(4) may be integrated with the tote 118 to provide a touchscreen with which the user 116 may select from a menu one or more particular items 104 for picking.

One or more microphones 122(5) may be configured to acquire audio data indicative of sound present in the environment. In some implementations, arrays of microphones 122(5) may be used. These arrays may implement beam-forming or other techniques to provide for directionality of gain. The inventory management system 128 may use the one or more microphones 122(5) to accept voice input from the users 116, determine the location of one or more users 116 in the facility 102, and so forth.

One or more weight sensors 122(6) may be configured to measure the weight of a load, such as the item 104, the tote 118, and so forth. The weight sensors 122(6) may be configured to measure the weight of the load at one or more of the inventory locations 114, the tote 118, or elsewhere. The weight sensors 122(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. The inventory management system 128 may use the data acquired by the weight sensors 122(6) to identify an object, determine a location of an object, maintain shipping records, and so forth. For example, the weight sensors 122(6) at a particular location in the facility 102 may report a weight of the user 116, indicating the user 116 is present at that location.

The sensors 122 may include one or more light sensors 122(7). The light sensors 122(7) may be configured to provide information associated with ambient lighting conditions such as a level of illumination. Information acquired by the light sensors 122(7) may be used by the inventory management system 128 to adjust a level, intensity, or configuration of the output device 210.

One or more radio frequency identification (RFID) readers 122(8), near field communication (NFC) systems, and so forth, may also be provided as sensors 122. For example, the RFID readers 122(8) may be configured to read the RF tags 206. Information acquired by the RFID reader 122(8) may be used by the inventory management system 128 to identify an object associated with the RF tag 206 such as the item 104, the tote 118, and so forth.

One or more RF receivers 122(9) may also be provided. In some implementations, the RF receivers 122(9) may be part of transceiver assemblies. The RF receivers 122(9) may be configured to acquire RF signals 208 associated with Wi-Fi, Bluetooth, ZigBee, 3G, 4G, LTE, or other wireless data transmission technologies. The RF receivers 122(9) may provide information associated with data transmitted via radio frequencies, signal strength of RF signals 208, and so forth. For example, information from the RF receivers 122(9) may be used by the inventory management system 128 to determine a location of an RF source such as a device carried by the user 116.

The sensors 122 may include one or more accelerometers 122(10), which may be worn or carried by the user 116, mounted to the tote 118, and so forth. The accelerometers 122(10) may provide information such as the direction and magnitude of an imposed acceleration. Data such as rate of acceleration, determination of changes in direction, speed, and so forth, may be determined using the accelerometers 122(10).

A gyroscope 122(11) may provide information indicative of rotation of an object affixed thereto. For example, the tote 118 or other objects or devices may be equipped with a gyroscope 122(11) to provide data indicative of a change in orientation.

A magnetometer 122(12) may be used to determine a heading by measuring ambient magnetic fields, such as the terrestrial magnetic field. The magnetometer 122(12) may be worn or carried by the user 116, mounted to the tote 118, and so forth. For example, the magnetometer 122(12) as worn by the user 116 may act as a compass and provide information indicative of which way the user 116 is facing.

A proximity sensor 122(13) may be used to determine presence of an object, such as the user 116, the tote 118, and so forth. The proximity sensors 122(13) may use optical, electrical, ultrasonic, electromagnetic, or other techniques to determine a presence of an object. In some implementations, the proximity sensors 122(13) may use an optical emitter and an optical detector to determine proximity. For example, an optical emitter may emit light, a portion of which may then be reflected by the object back to the optical detector to provide an indication that the object is proximate to the proximity sensor 122(13). In other implementations, the proximity sensors 122(13) may comprise a capacitive proximity sensor 122(13) configured to provide an electrical field and determine a change in electrical capacitance due to presence or absence of an object within the electrical field.

The proximity sensors 122(13) may be configured to provide sensor data 132 indicative of one or more of a presence or absence of an object, a distance to the object, or characteristics of the object. An optical proximity sensor 122(13) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an imaging sensor 122(1) such as a camera. Based on an apparent distance between the features of the structured light pattern, the distance to the object may be calculated. Other techniques may also be used to determine distance to the object. In another example, the color of the reflected light may be used to characterize the object, such as clothing, tote 118, and so forth. In some implementations, a proximity sensor 122(13) may be installed at the inventory location 114.

The sensors 122 may include temperature sensors 122(14). The temperature sensors 122(14) may include bimetallic thermometers, thermocouples, infrared, thermistors, semiconductor devices, optical fibers, and so forth. The temperature sensors 122(14) generate data indicative of a temperature.

The sensors 122 may include other sensors 122(S) as well. For example, the other sensors 122(S) may include instrumented auto-facing units, thermometers, barometric sensors, hygrometers, or biometric input devices including, but not limited to, fingerprint readers or palm scanners. Instrumented auto-facing units may be configured to maintain items 104 in an orderly fashion and provide information indicative of addition or removal of items 104 from the instrumented auto-facing unit. For example, the instrumented auto-facing unit may include a position sensor that moves responsive to a pick or place of an item 104 therefrom.

The facility 102 may include one or more access points 212 configured to establish one or more wireless networks. The access points 212 may use Wi-Fi, NFC, Bluetooth, or other technologies to establish wireless communications between a device and the network 202. The wireless networks allow the devices to communicate with one or more of the inventory management system 128, the sensors 122, the sensor devices 120, the tag 206, a communication device of the tote 118, or other devices. In other implementations, a wired networking infrastructure may be implemented. For example, cabling may be used to provide Ethernet local area network connectivity.

The output devices 210 may also be provided in the facility 102. The output devices 210 may be configured to generate signals that may be perceived by the user 116.

Haptic output devices 210(1) may be configured to provide a signal that results in a tactile sensation to the user 116. The haptic output devices 210(1) may use one or more mechanisms such as electrical stimulation or mechanical displacement to provide the signal. For example, the haptic output devices 210(1) may be configured to generate a modulated electrical signal that produces an apparent tactile sensation in one or more fingers of the user 116. In another example, the haptic output devices 210(1) may comprise piezoelectric or rotary motor devices configured to provide a vibration that may be felt by the user 116.

One or more audio output devices 210(2) are configured to provide acoustic output. The acoustic output includes one or more of infrasonic sound, audible sound, or ultrasonic sound. The audio output devices 210(2) may use one or more mechanisms to generate the sound. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display output devices 210(3) may be configured to provide output that may be seen by the user 116 or detected by a light-sensitive detector such as an imaging sensor 122(1) or light sensor 122(7). The output from the display output devices 210(3) may be monochrome or color. The display output devices 210(3) may be emissive, reflective, or both emissive and reflective. An emissive display output device 210(3) is configured to emit light during operation. For example, a LED is an emissive visual display output device 210(3). In comparison, a reflective display output device 210(3) relies on ambient light to present an image. For example, an electrophoretic display is a reflective display output device 210(3). Backlights or front lights may be used to illuminate the reflective visual display output device 210(3) to provide visibility of the information in conditions where the ambient light levels are low.

Mechanisms of the display output devices 210(3) may include liquid crystal displays (LCDs), transparent organic LEDs, electrophoretic displays, image projectors, or other display mechanisms. The other display mechanisms may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display output devices 210(3) may be configured to present images. For example, the display output devices 210(3) may comprise a pixel-addressable display. The image may comprise at least a two-dimensional array of pixels or a vector representation of an at least two-dimensional image.

In some implementations, the display output devices 210(3) may be configured to provide non-image data, such as text characters, colors, and so forth. For example, a segmented electrophoretic display, segmented LED, and so forth, may be used to present information such as a stock keeping unit (SKU) number. The display output devices 210(3) may also be configurable to vary the color of the text, such as using multicolor LED segments.

In some implementations, display output devices 210(3) may be configurable to provide image or non-image output. For example, an electrophoretic display output device 210(3) with addressable pixels may be used to present images of text information, or all of the pixels may be set to a solid color to provide a colored panel.

The output devices 210 may include hardware processors, memory, and other elements configured to present a user interface. In one implementation, the display output devices 210(3) may be arranged along the edges of inventory locations 114.

Other output devices 210(T) may also be present at the facility 102. The other output devices 210(T) may include lights, scent/odor dispensers, document printers, three-dimensional printers or fabrication equipment, and so forth. For example, the other output devices 210(T) may include lights that are located on the inventory locations 114, the totes 118, and so forth.

Figure 3:
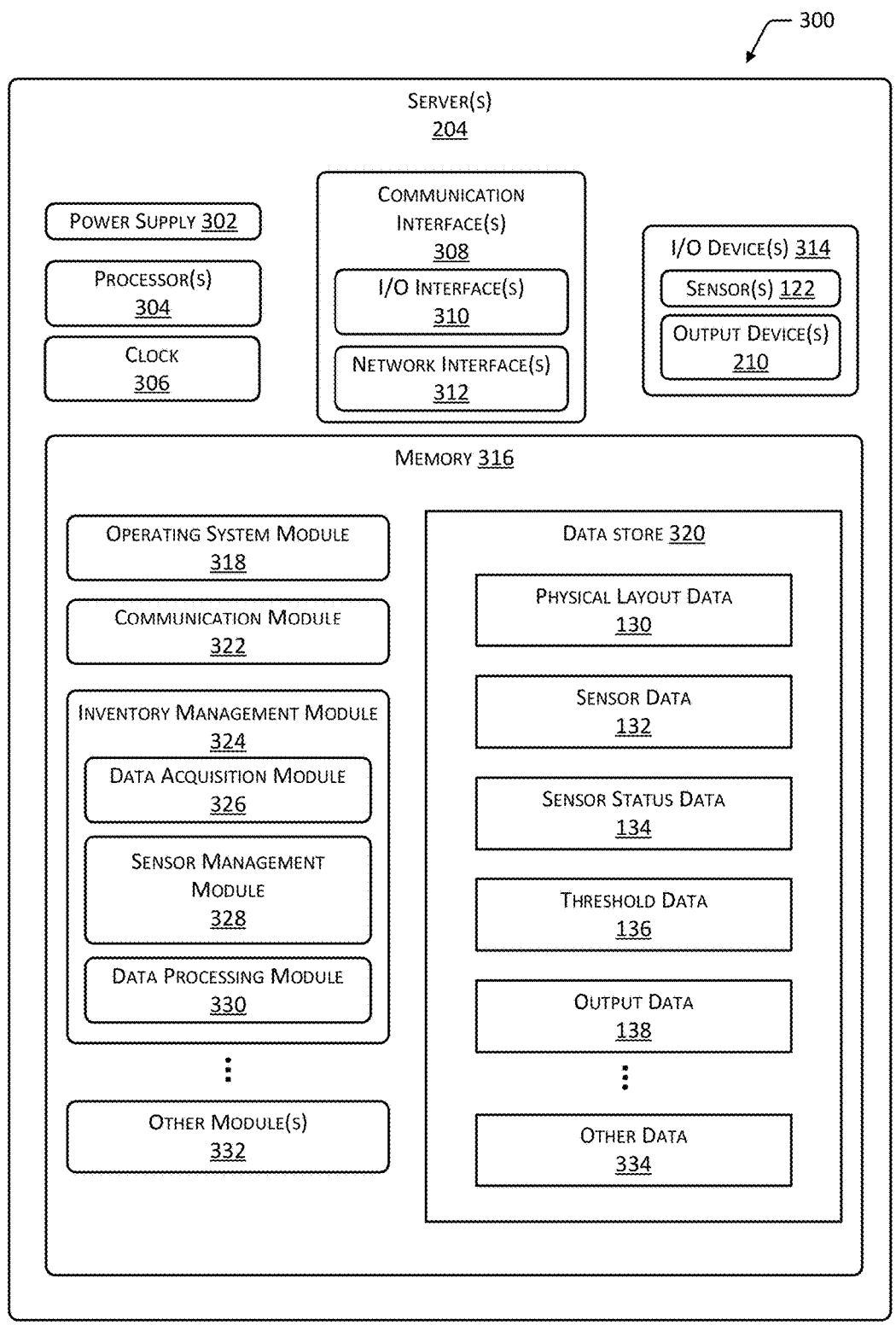
FIG. 3 illustrates a block diagram of a server configured to support operation of the facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 are configured to provide electrical power suitable for operating the components in the server 204. The server 204 may include one or more hardware processors 304 (processors) configured to execute one or more stored instructions. The processors 304 may comprise one or more cores. The cores may be of one or more types. For example, the processors 304 may include application processor units, graphic processing units, and so forth. One or more clocks 306 may provide information indicative of date, time, ticks, and so forth. For example, the processor 304 may use data from the clock 306 to generate timestamps, trigger a preprogrammed action, and so forth.

The server 204 may include one or more communication interfaces 308, such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 122, keyboard, mouse, scanner, and so forth. The I/O devices 314 may also include output devices 210 such as one or more of a display output device 210(3), printer, audio speakers, and so forth. In some embodiments, the I/O devices 314 may be physically incorporated with the server 204 or may be externally placed.

The network interfaces 312 are configured to provide communications between the server 204 and other devices, such as the totes 118, routers, access points 212, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi, Bluetooth, ZigBee, and so forth.

The server 204 may also include one or more busses or other internal communications hardware or software that allow for the transfer of data between the various modules and components of the server 204.

As shown in FIG. 3, the server 204 includes one or more memories 316. The memory 316 comprises one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 may provide storage of computer-readable instructions, data structures, program modules, and other data for the operation of the server 204. A few example functional modules are shown stored in the memory 316, although the same functionality may alternatively be implemented in hardware, firmware, or as a system on a chip (SoC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, the sensors 122, the display output devices 210(3), other servers 204, or other devices. The communications may be authenticated, encrypted, and so forth.

The memory 316 may store an inventory management module 324. The inventory management module 324 may be configured to provide the inventory functions as described herein with regard to the inventory management system 128. For example, the inventory management module 324 may track items 104 between different inventory locations 114, to and from the totes 118, and so forth.

The inventory management module 324 may include one or more of a data acquisition module 326, a sensor management module 328, or a data processing module 330. The data acquisition module 326 may be configured to acquire and access information associated with operation of the facility 102. For example, the data acquisition module 326 may acquire information from the sensor devices 120, the sensors 122, and so forth.

The inventory management module 324 may be configured to track objects in the facility 102 or provide other services using the physical layout data 130, the sensor data 132, the sensor status data 134, and so forth, which may be stored in the data store 320.

The physical layout data 130 comprises information about the physical configuration of the facility 102 or portions thereof. For example, the physical layout data 130 may include electronic representations of the physical structures in the facility 102, such as CAD data of the aisle 112 configurations, inventory locations 114, information about which items 104 are in what inventory locations 114, real coordinates of the sensor devices 120, and so forth. The physical layout data 130 may include information about the presence of walls; HVAC equipment; location of doors and windows; and so forth.

The sensor data 132 may comprise information acquired from, or based on, the one or more sensors 122. For example, the sensor data 132 may comprise 3D information about an object in the facility 102 as acquired by the 3D sensors 122(2) or weight data as acquired by the weight sensors 122(6).

The sensor management module 328 may be configured to use one or more of the physical layout data 130, the sensor data 132, the sensor status data 134, and so forth, to manage operation of the sensor devices 120, the sensors 122, the enclosures 126, and so forth. For example, the sensor management module 328 may assess the quality of the sensor status data 134 from an imaging sensor 122(1) to determine that the viewable area of the enclosure 126 for that sensor 122 is fogged. Continuing the example, a blur detection module may be used to determine the presence of fogging on the window. In another implementation, the sensor management module 328 may determine conditions are likely prone to fogging or icing of the window in the enclosure 126 based on data from temperature sensors, hygrometers, information indicative of dew point, and so forth.

The data processing module 330 is configured to process at least a portion of the sensor data 132. In some implementations, the data processing module 330 executed by the server 204 may implement different functions from those performed by the data processing module 330 executed on the sensor device 120. For example, the data processing module 330 executed by the server 204 may use functions that require computational or memory resources that exceed those available on the sensor device 120. For example, the data processing module 330 may perform object recognition using more comprehensive classifiers.

The inventory management module 324 may use the sensor data 132 to generate output data 138. The output data 138 may include information about one or more objects, movement of those objects, and so forth. For example, the output data 138 may comprise identification data about an object, such as the user identity of the user 116. The identity of the user 116 may be determined by processing at least a portion of the sensor data 132 received from one or more sensor devices 120. In another example, the output data 138 may include tracking data indicative of location data or motion data of an object within the facility 102 based on sensor data 132 received from one or more sensor devices 120. The identification data may identify a particular user 116, a particular item 104, tote 118, or other object. For example, the identification data may comprise an account name, a real name, a temporary identifier issued to a previously unregistered user 116, and so forth.

The tracking data provides information as to the location of an object within the facility 102, movement of the object, and so forth. For example, the tracking data may comprise data indicative of the user 116 being in aisle 112(13) in front of the inventory location 114(37) and picking an item 104.

The data processing module 330 may be configured to use one or more data processing functions to identify an object depicted in the sensor data 132, a position of the object in the sensor data 132, determine motion of objects in an image, detect moisture on the window or the effects thereof, and so forth. The objects may include, but are not limited to, the items 104, users 116, totes 118, and so forth.

The data processing functions described in this disclosure may be performed at least in part using one or more of the following tools or techniques. In one implementation, the object recognition or other image processing described in this disclosure may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the images. In another implementation, the EyeFace SDK as promulgated by Eyedea Recognition Ltd. of Prague, Czech Republic, may be used to process the image data. The OpenBR library and tools as originated by MITRE Corporation of Bedford, Mass., USA, and McLean, Va., USA, and promulgated by the OpenBR group at openbiometrics.org may also be used in some implementations for image processing.

Clothing recognition analyzes images to determine what articles of clothing, ornamentation, and so forth, the user 116 is wearing or carrying in the facility 102. Skin and hair detection algorithms may be used to classify portions of the image that are associated with the user's 116 skin or hair. Articles that are not skin and hair may be classified into various types of articles of clothing such as shirts, hats, pants, bags, and so forth. The articles of clothing may be classified according to function, position, manufacturer, and so forth. Classification may be based on clothing color, texture, shape, position on the user 116, and so forth. For example, classification may designate an article of clothing worn on the torso as a "blouse" while color or pattern information may be used to determine a particular designer or manufacturer. The determination of the article of clothing may use a comparison of information from the images with previously stored data. Continuing the example, the pattern of the blouse may have been previously stored along with information indicative of the designer or manufacturer.

In some implementations, identification of the user 116 may be based on the particular combination of classified articles of clothing. The clothing may be used to identify the user 116 or to distinguish one user 116 from another. For example, the user 116(1) may be distinguished from the user 116(2) based at least in part on the user 116(1) wearing a hat and a red shirt while the user 116(2) is not wearing a hat and is wearing a blue shirt.

Gait recognition techniques analyze one or more of images, three-dimensional data, or other data, to assess how a user 116 moves over time. Gait comprises a recognizable pattern of movement of the user's 116 body that is affected by height, age, and other factors. Gait recognition may analyze the relative position and motion of limbs of the user 116. Limbs may include one or more arms, legs, and in some implementations, the head. In one implementation, edge detection techniques may be used to extract a position of one or more limbs of the user 116 in the series of images. For example, a main leg angle of a user's 116 leg may be determined, and based on the measurement of this main leg angle over time and from different points-of-view, a three-dimensional model of the leg motion may be generated. The change in position over time of the limbs may be determined and compared with previously stored information to determine an identity of the user 116 or to distinguish one user 116 from another.

In some implementations, identity of the object may be based on a combination of these or other recognition techniques. For example, the user 116 may be identified based on clothing recognition, gait recognition, object recognition, and so forth. The different recognition techniques may be used in different situations or in succession. For example, clothing recognition and gait recognition may be used at greater distances between the user 116 and the imaging sensors 122(1) or when sensor data is inadequate for accurate object recognition. Once identified, such as by way of object recognition, one or more of gait recognition or clothing recognition may be used to track the user 116 within the facility 102.

Other techniques such as artificial neural networks (ANN), active appearance models (AAM), active shape models (ASM), cascade classifiers, support vector machines, active shape models (ASM), Haar detectors, local binary pattern (LBP) classifiers, and so forth, may also be used to process images. For example, the ANN may be a trained using a supervised learning algorithm such that object identifiers are associated with images of particular objects within training images provided to the ANN. In another example, the ANN may be trained to recognize a particular shape is associated with the user 116. Once trained, the ANN may be provided with the images and may provide, as output, the object identifier.

Other modules 332 may also be present in the memory 316, as well as other data 334 in the data store 320. For example, the other modules 332 may include an accounting module. The accounting module may be configured to add or remove charges to an account based on movement of the items 104 determined from the sensor data 132. The other data 334 may comprise information such as costs of the items 104 for use by the accounting module.

Figure 4:
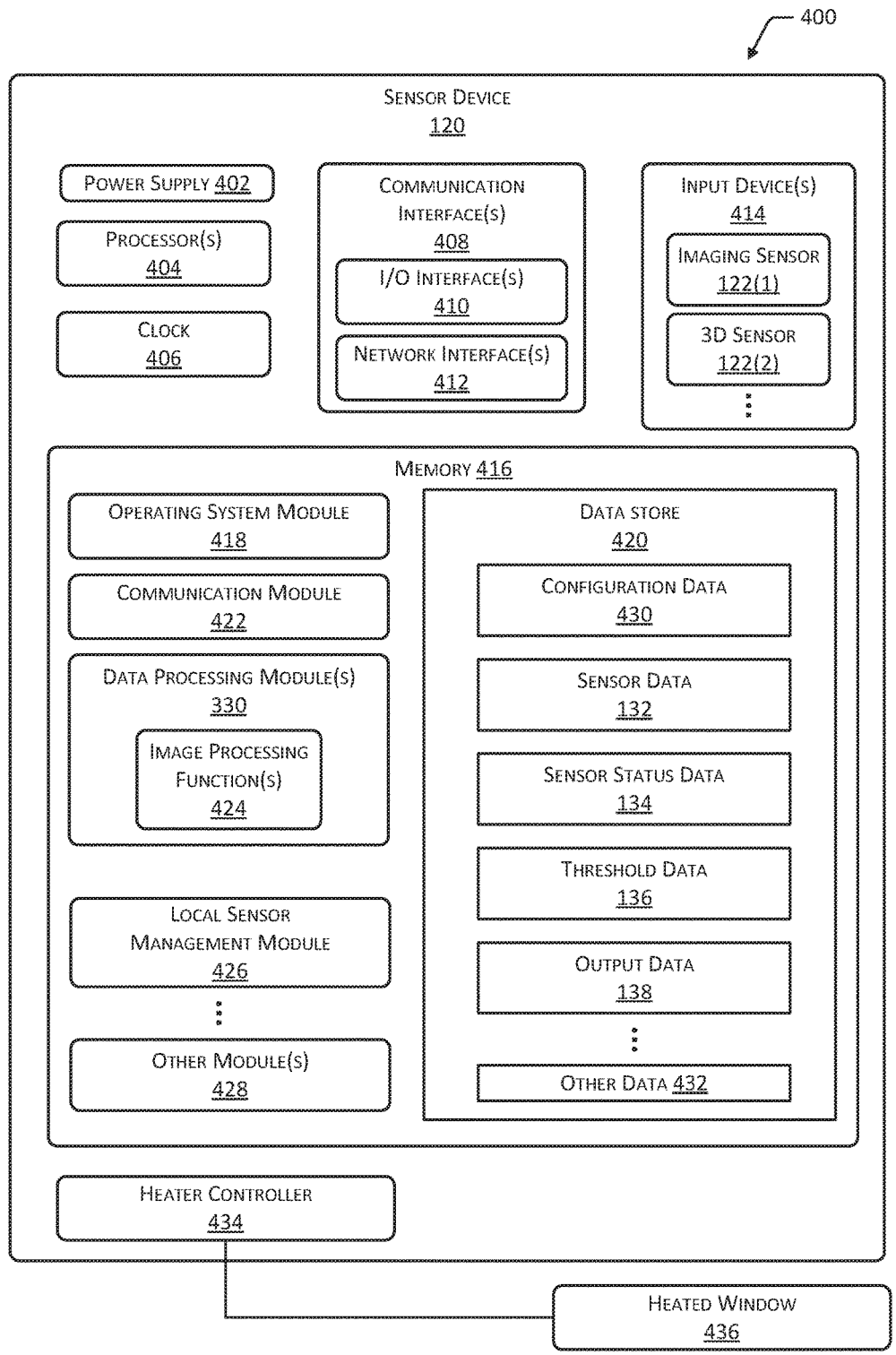
FIG. 4 illustrates a block diagram of a sensor device, according to some implementations.

FIG. 4 illustrates a block diagram 400 of a sensor device 120, according to some implementations.

One or more power supplies 402 are configured to provide electrical power suitable for operating the components in the sensor device 120. The power supply 402 may provide power conditioning such as direct current (DC) to DC conversion, alternating current (AC) to DC conversion, voltage adjustment, frequency adjustment, and so forth. In one implementation, the power supply 402 may be configured to acquire electrical energy from a communication interface, such as a wired Ethernet connection providing power over one or more of the wires. In another implementation, the power supply 402 may comprise a wireless power receiver configured to receive transmitted electrical energy. For example, the power supply 402 may include an inductive loop or capacitive plate configured to receive electrical energy from another inductive loop or capacitive plate external to the sensor device 120.

The sensor device 120 may include one or more hardware processors 404 (processors) configured to execute one or more stored instructions. The processors 404 may comprise one or more cores of different types, functions, and so forth. For example, the processors 404 may include application processor units, graphic processing units, and so forth. In one implementation, the processor 404 may comprise the Tegra K1 processor from Nvidia Corporation of Santa Clara, Calif. In another implementation, the processor 404 may comprise an Etron eSP870 processor from Etron Technology America, Inc. of Santa Clara, Calif., configured to process image data from two or more imaging sensors 122(1) and generate depth data.

One or more clocks 406 may provide information indicative of date, time, ticks, and so forth. For example, the processor 404 may use data from the clock 406 to generate timestamps, trigger a preprogrammed action, and so forth.

The sensor device 120 may include one or more communication interfaces 408, such as I/O interfaces 410, network interfaces 412, and so forth. The communication interfaces 408 enable the sensor device 120, or components thereof, to communicate with other devices or components. The communication interfaces 408 may include one or more I/O interfaces 410. The I/O interfaces 410 may comprise I2C, SPI, USB, RS-232, and so forth.

The I/O interface(s) 410 may couple to one or more input devices 414. In some implementations, the sensor device 120 may be a "headless" device, in that it may not have any output devices 210 onboard for use by a human. The input devices 414 may include sensors 122, such as the imaging sensor 122(1), 3D sensor 122(2), and so forth. A single sensor device 120 may include, support, or otherwise be associated with one or more sensors 122. For example, the sensor device 120 may include a 3D sensor 122(2) comprising a pair of stereoscopic infrared imaging sensors 122(1) to provide stereoscopic infrared imaging and a visible light (red-green-blue or "RGB") imaging sensor 122(1). For example, the stereoscopic infrared imaging sensors 122(1) may comprise an Aptina AR0134 from Aptina Imaging Corporation of San Jose, Calif. In one implementation, the pair of imaging sensors in the 3D sensor 122(2) may be arranged along a 200 mm baseline relative to one another to provide for a disparity of FOV 124 suitable for stereoscopic vision.

The input devices 414 may be at least partially physically incorporated within the sensor device 120. In one implementation, the 3D sensor 122(2) may be incorporated within an enclosure 126 of the sensor device 120. The enclosure 126 may comprise a case, which may have an opening for light to enter to reach the sensors 122, such as the imaging sensor(s) 122(1). In another implementation, at least a portion of the sensor 122 may be configured to pan, tilt, or rotate, relative to the enclosure. In yet another implementation, the sensor device 120 may comprise a main enclosure 126 attached to one or more secondary enclosures 126 containing one or more of the input devices 414. For example, the imaging sensors 122(1) may be located within a separate enclosure 126 and coupled by way of a cable to the main enclosure 126 of the sensor device 120.

The network interfaces 412 are configured to provide communications between the sensor device 120 and other devices, routers, servers 204, access points 212, and so forth. The network interfaces 412 may include devices configured to couple to PANs, LANs, WANs, and so forth. For example, the network interfaces 412 may include devices compatible with Ethernet, Wi-Fi, Bluetooth, ZigBee, and so forth.

The sensor device 120 may also include one or more busses or other internal communications hardware or software that allow for the transfer of data between the various modules and components.

As shown in FIG. 4, the sensor device 120 includes one or more memories 416. The memory 416 comprises one or more non-transitory CRSM, as described above. The memory 416 provides storage of computer-readable instructions, data structures, program modules, and other data for the operation of the sensor device 120. A few example functional modules are shown stored in the memory 416, although the same functionality may alternatively be implemented in hardware, firmware, or as a SoC.

The memory 416 may include at least one OS module 418. The OS module 418 is configured to manage hardware resource devices such as the communication interfaces 408, the input devices 414, and so forth, and provide various services to applications or modules executing on the processors 404. The OS module 418 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 416 may be a data store 420 and one or more of the following modules. These modules may be executed as foreground applications, background tasks, daemons, and so forth. The data store 420 may use a flat file, database, linked list, tree, executable code, script, or other data structure to store information. In some implementations, the data store 420 or a portion of the data store 420 may be distributed across one or more other devices including other sensor devices 120, network attached storage devices, and so forth.

A communication module 422 may be configured to establish communications with one or more of the other sensor devices 120, servers 204, or other devices. The communications may be authenticated, encrypted, and so forth.

The memory 416 may store a data processing module 330, such as described above. The data processing module 330 may provide one or more data functions. For example, the data processing module 330 may implement one or more image processing functions 424, such as a threshold function 424(1), a motion vector function 424(2), an object recognition function 424(3), and so forth.

The threshold function 424(1) is configured to apply a thresholding operation to sensor data 132, such as image data obtained from an imaging sensor 122(1), point cloud data from a 3D sensor 122(2), and so forth. For example, the threshold function 424(1) may be configured to generate a binary image from image data. Continuing the example, implementations utilizing the OpenCV library may execute the function "threshold" to generate sensor data 132 comprising a binary image. In one implementation, the binary image comprises a digital image in which each pixel is expressed as a single bit value, such as a "1" or a "0". For example, the binary image may comprise a version of the image data that has been reduced to a 1-bit depth for each pixel.

The motion vector function 424(2) may be configured to provide a motion vector associated with a portion of the image data. For example, the user 116 walking through the FOV 124 may manifest as a group of pixels changing from one frame of image data to another. The motion vector function 424(2) may generate sensor data 132 comprising information indicative of an optical flow between a plurality of images. Continuing the example, implementations utilizing the OpenCV library, the functions "calcOpticalFlowPyrLKd" or "DenseOpticalFlow" may be used to generate sensor data 132 comprising motion data.

The object recognition function 424(3) may be configured to provide information that identifies an object. In one implementation, the object recognition function 424(3) may be configured to identify a human face within image data. Continuing the example, implementations utilizing the OpenCV library, the function "FaceRecognizer" may be used to generate sensor data 132 comprising a subset of the image data that includes the image of the face.

The data processing module 330 may include other functions 424(F) as well. For example, a depth data generation module may be configured to generate depth data from image data acquired by two or more imaging sensors 122(1) separated by a distance, from the 3D sensor 122(2), and so forth. Continuing the example, output from the two or more imaging sensors 122(1) may be used to generate sparse stereo depth data, dense stereo depth data, and so forth. Other modules may provide registration data for alignment between depth data and image data, construction of three-dimensional point clouds, point cloud projection, application of one or more filter functions, and so forth.

The other functions 424(F) may also include data compression. For example, the sensor data 132 may comprise image data for which the background has been removed, and the image of the remaining foreground object(s) has been processed with one or more filter functions.

A local sensor management module 426 may also be stored in the memory 416. The local sensor management module 426 may be configured to control operation of one or more components in the sensor device 120. For example, the local sensor management module 426 may gather data from various hardware sensors and software systems to generate the sensor status data 134 indicative of the temperature outside of the enclosure 126 that encloses the sensor device 120. The local sensor management module 426 may access threshold data 136 stored in the data store 420, from one or more of the servers 204, or a combination thereof.

The local sensor management module 426 may pass the sensor status data 134 to the data processing module 330 onboard the sensor device 120, the data processing module 330 at the server 204, or both. Operation of the data processing module 330 may then change based at least in part on one or more of the analysis of the sensor data 132, analysis of the sensor status data 134, and so forth. For example, determination of blur due to moisture may result in use of de-blurring techniques to try and electronically sharpen the image.

Configuration data 430 may be stored in the data store 420. The configuration data 430 may include information such as cryptographic keys for the communication module 422, parameters for the data processing modules 330, parameters for the local sensor management module 426, and so forth.

Other modules 428 may also be present in the memory 416, as well as other data 432 in the data store 420. For example, the other modules 428 may include a power management module. The power management module may be configured to transition the sensor device 120 between a low power mode and a higher power operating mode. For example, the data processing module 330 may determine that no motion has occurred within subsequent image data for a threshold amount of time. Responsive to this determination, the power management module may place the sensor device 120 into a lower power mode, to reduce power consumption, heat generation, and so forth. The other data 432 may comprise information such as timing thresholds for use by the power management module.

The sensor device 120 may also include one or more heater controllers 434 and one or more heated windows 436. The heater controller 434 is configured to control distribution of energy to one or more heater elements of the heated window 436. The heated window 436 provides a viewable area that is heated to mitigate moisture accumulation within the FOV 124 of the sensor 122.

In some implementations, the heater controller 434 and the heated windows 436 may be part of the enclosure 126, rather than the sensor device 120. In other implementations the sensor device 120, the enclosure 126, the heater controller 434, and the heated window 436 may be combined into a single apparatus.

The heater controller 434 may comprise one or more of current regulator circuitry, voltage regulator circuitry, or other circuitry to deliver a predetermined amount of electrical energy to one or more heater elements of the heated window 436. For example, pulse width modulation may be used to control the amount of electrical energy delivered to the one or more heater elements.

In some implementations, the heater controller 434 may dynamically adjust the amount of electrical energy delivered to the one or more heater elements responsive to input. For example, a thermometer or other temperature sensing device may be used to measure ambient air temperature of an exterior environment, temperature of a portion of the heated window, detect condensation on the heated window 436, and so forth. Based on the sensor data 132 indicative of temperature, the amount of electrical energy delivered to the heater element may change. For example, as the temperature exterior to the enclosure 126 decreases below a value specified in the threshold data 136, additional electrical energy may be provided to the one or more heater elements of the heated window 436. Likewise, if the temperature of the heated window 436 reaches a particular maximum value specified by the threshold data 136, the quantity of electrical energy provided to the one or more heater elements may be reduced.

In some implementations, the data processing module 330 may analyze sensor data 132 to determine degradation consistent with accumulation of moisture on a window within the FOV 124 of the sensor 122. For example, the sensor data 132 comprising images acquired by an imaging sensor 122(1) may be analyzed to quantify blur in the image. The local sensor management module 426 compares the value of the blur with a threshold blur value specified in the threshold data 136. If the blur detected exceeds the threshold blur value, the local sensor management module 426 may initiate action to mitigate the moisture. For example, the heater controller 434 may receive an instruction to increase the amount of heat distributed to the heated window 436.

Figure 5:
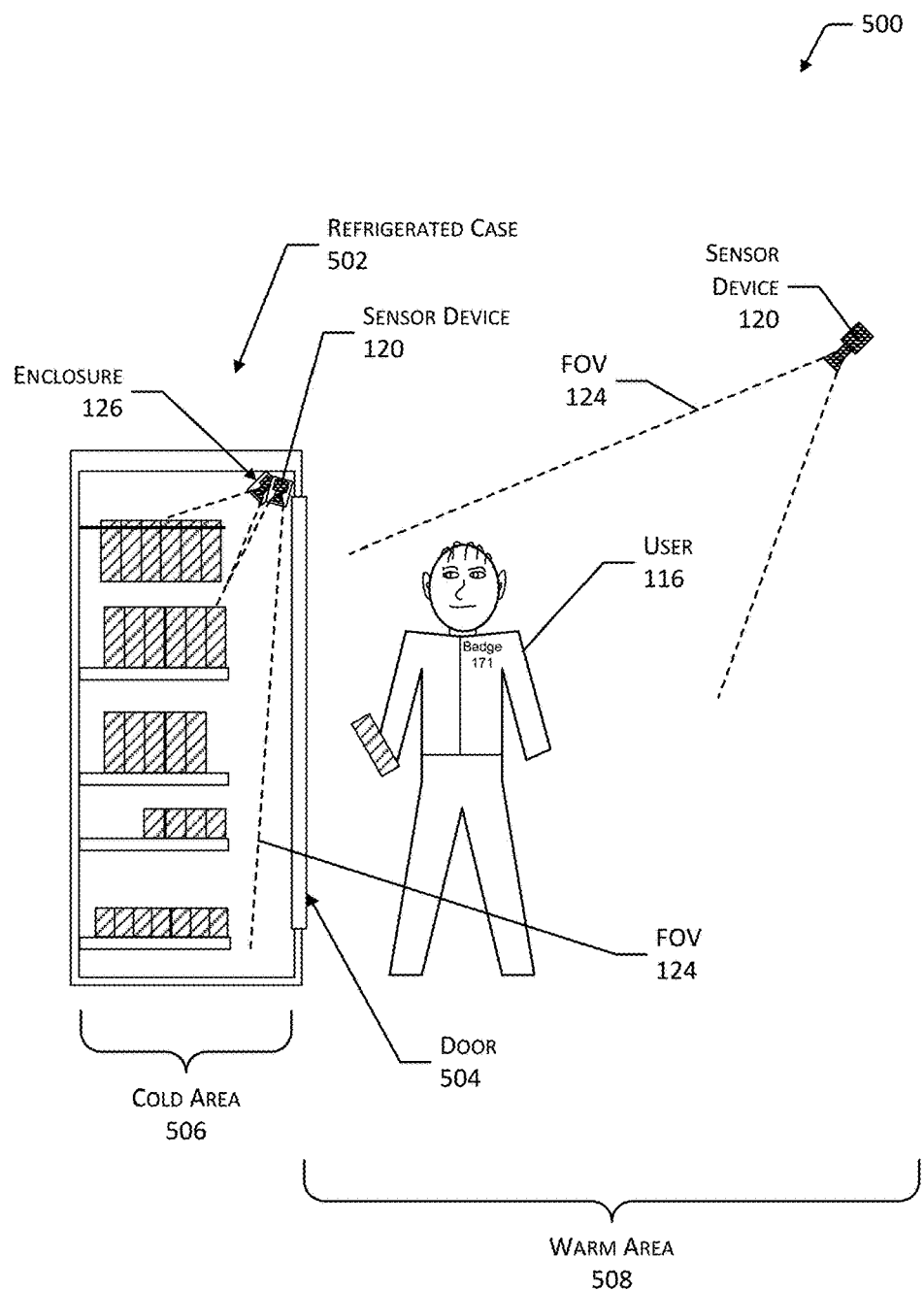
FIG. 5 illustrates an enclosure with a sensor device to acquire sensor data from inside a refrigerated area, according to some implementations.

FIG. 5 illustrates a side view 500 of an enclosure 126 that encloses a sensor device 120 used to acquire sensor data 132 from inside a cold area, according to some implementations. While this and the other examples within describe use of the enclosure 126 in a refrigerated area, in some implementations the area may be cold without refrigeration. For example, the enclosure 126 may be located outdoors on an exterior of the facility 102, exposed to freezing temperatures in a temperate climate.

As illustrated here, the user 116 is standing in front of a refrigerated case 502 that includes a door 504. The user 116 may open the door 504 to pick or place an item 104 within the refrigerated case 502. The refrigerated case 502 maintains a cold area 506 with an ambient air temperature that is below a threshold temperature. For example, the refrigerated case 502 may maintain a temperature below 0 degrees Celsius. In comparison, a warm area 508 is that which is outside of the refrigerated case 502. For example, the aisle 112 may be the warm area 508 that is kept at a temperature comfortable for the users 116, such as about 21 degrees Celsius. However, in some implementations there may be little or no temperature difference between the interior of the enclosure 126 and the exterior. For example, the enclosure 126 may be uninsulated, may utilize heat sinks, and so forth.

Within the refrigerated case 502, in the cold area 506, may be one or more enclosures 126. Each enclosure 126 may include one or more sensor devices 120 or sensors 122. Users 116 may open and close the door 504, allowing warm, relatively moist air from the warm area 508 to enter the cold area 506 of the refrigerated case 502. In some implementations, the door 504 may be omitted.

Without the application of energy to produce heat in the heated window 436, the window would otherwise fog or ice up as moisture from the warm area 508 comes into contact with the otherwise cold surface. This accumulation of moisture may obscure the FOV 124, impairing the ability of the sensor 122 to operate.

By using the heater controller 434 to direct energy to the heater elements of the heated window 436, a viewable area may be maintained. Within the viewable area the accumulation of moisture may be prevented by using the techniques described in this disclosure.

In other implementations, the heated window 436 may be inset into the refrigerated case 502, a wall for a refrigerated room, and so forth. For example, a portion of a top of the refrigerated case 502 may comprise the heated window 436, and the heater controller 434 may be part of the refrigerated case 502. The sensors devices 120, without enclosure 126, may be positioned with the FOV 124 of the sensors 122 directed through viewable areas in the heated window 436.

Figure 6:
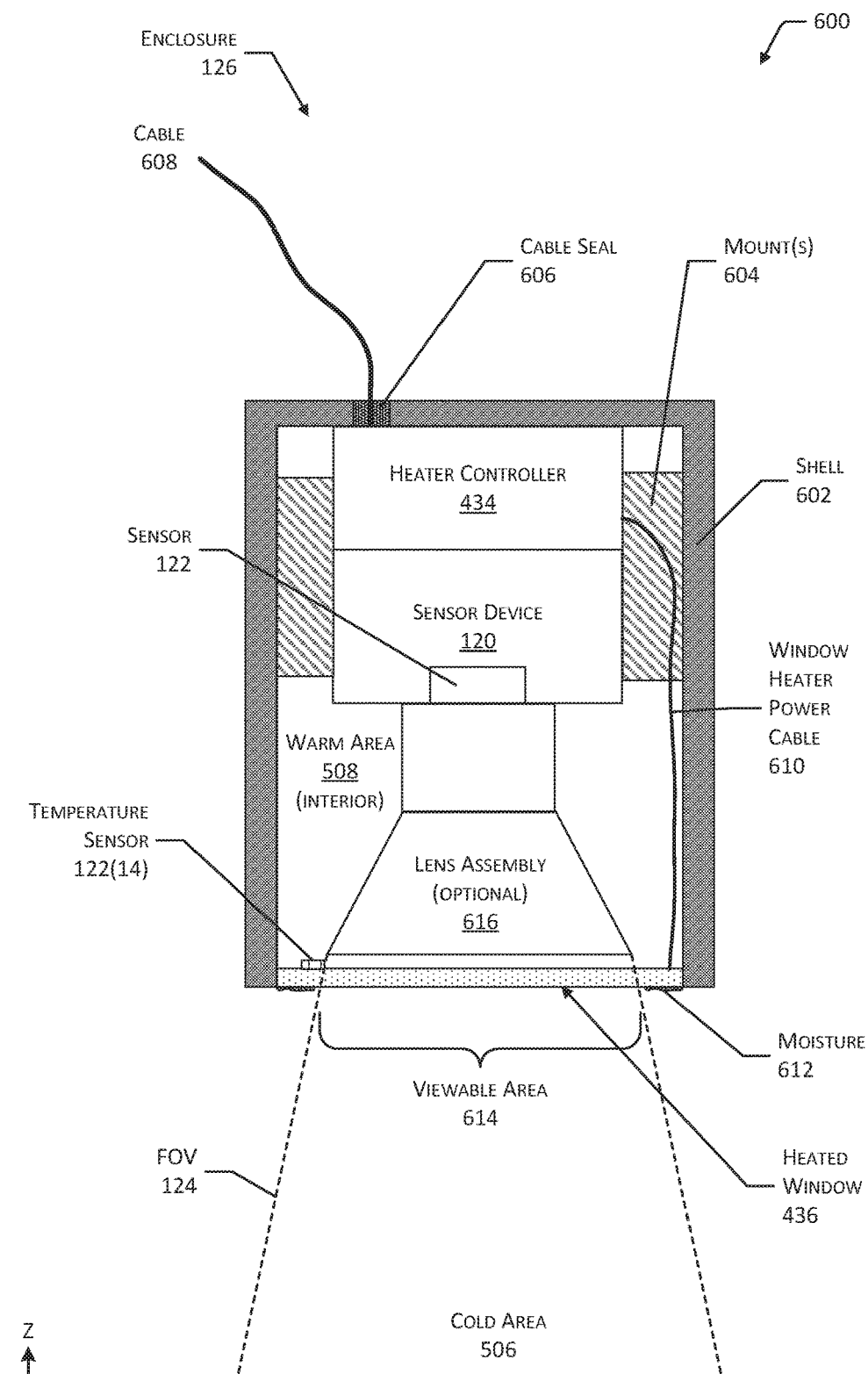
FIG. 6 illustrates an enclosure with a sensor device inside and a heated window to provide a viewable area, according to some implementations.

FIG. 6 illustrates a cross-sectional view 600 of an enclosure 126 with a sensor device 120 inside and a heated window 436, according to some implementations.

The enclosure 126 may comprise a shell 602. In some implementations, at least a portion of the shell 602 may comprise one or more layers of a thermal insulator, or may have a thermal insulator placed adjacent thereto. For example, the shell 602 may include an inner shell and an outer shell with one or more layers of thermal insulation between the inner shell and the outer shell. For example, the insulation may comprise a foam, aerogel, ceramic, evacuated (vacuum) panel, polymer, and so forth. In other implementations, the shell 602 may be uninsulated.

Within the enclosure 126 may be one or more mounts 604 that provide a structure for mechanical support between the shell 602 and one or more devices inside the shell 602. For example, the mount 604 may comprise standoffs or other mechanical engagement features or structures to engage the sensor device 120.

Within the shell 602, may be one or more sensor devices 120, heater controllers 434, and so forth. In some implementations, the heater controller 434 may be built into or otherwise incorporated into the shell 602. The heater controller 434 may be responsive to temperature data obtained from the temperature sensor. For example, a thermocouple may provide information indicative of a temperature, and based on this information the heater controller 434 may increase or decrease the amount of energy sent to the heater elements. The heater controller 434 may be configured to maintain the viewable area 614 at or below a dewpoint of an exterior environment outside of the enclosure 126. For example, with the use of the anti-fog coating, a temperature below the dewpoint may suffice to remove moisture 612 and maintain a clear view through the viewable area 614. In some implementations, the heater controller 434 may be configured to maintain the viewable area 614 at a particular temperature range of temperatures. For example, the heater controller 434 may access threshold data 136 that specifies a minimum set point and a maximum set point temperature. The minimum set point may be a value such as 0° C. while the maximum set point may be a determined dewpoint of the atmosphere exterior to the enclosure 126. The dewpoint may be determined based at least in part on temperature, humidity, and so forth. While maintaining the temperature above the dewpoint may prevent the accumulation of moisture 612, maintaining this temperature results in additional expenditure of energy without necessarily producing a particular benefit.

In other implementations, the interior of the enclosure 126 may be colder than the exterior. For example, the sensor device 120 may operate at cryogenic temperatures and moisture 612 may accumulate on the interior side of the heated window 436. In these implementations, the heated window 436 may still operate as described to prevent accumulation of moisture 612 within the viewable area 614. In other implementations, the heater controller 434 may not use sensor input but instead may be configured to deliver a predetermined amount of energy. The predetermined amount of energy may be specified by manual adjustment of one or more analog components, or may be adjustable by way of data received. For example, the heater controller 434 may have an I2C interface allowing it to communicate with the processor 404 and be configured to increase or decrease power distribution.

A cable seal 606 provides a seal around the cable 608 that passes from an interior of the shell 602 to an exterior. The cable 608 may comprise one or more electrical conductors, optical fibers, and so forth. The cable 608 may include electrical conductors to deliver electrical energy to the devices associated with the enclosure 126. For example, the cable 608 may deliver electrical power to the heater controller 434 that is inside the shell 602. The cable 608 may comprise an ethernet cable that may be used to transfer data, electrical energy to power the heated window 436, and so forth. In some implementations, the cable seal 606 may comprise a room temperature vulcanizing silicone rubber, foam, gasket, and so forth.

A window heater power cable 610 provides an electrically conductive pathway between the heater controller 434 and the heated window 436. In some implementations, the window heater power cable 610 may comprise a flexible printed circuit (FPC). The electrical conductors in the window heater power cable 610 may be bonded to window heater power contact areas on the heated window 436 using anisotropic conductive film. This is discussed in more detail below with regard to FIG. 8.

The heated window 436 is set within at least a portion of the shell 602, and provides a barrier between the cold area 506 that is external to the shell 602 and the warm area 508 that is internal to the shell 602. The heated window 436 may be mounted using one or more mechanical fasteners or mechanical engagement features. In some implementations, the heated window 436 may be bonded to the shell 602 using an adhesive.

The heated window 436 has an interior side that is within the warm area 508 and an exterior side that is presented to the cold area 506. In some situations, moisture 612 may accumulate on one or more of the interior side or the exterior side of the heated window 436. For example, residual moisture in the air inside the enclosure 126 may condense on the heated window 436, causing fogging. In another example, the unheated portions of the heated window 436 may be below a dewpoint of the ambient atmosphere outside of the enclosure 126, resulting in condensation of moisture 612 on exterior surfaces of the enclosure 126, including portions of the heated window 436 that are also below the dewpoint.

The heated window 436 includes one or more heater elements as described below that provide a viewable area 614. At least a portion of the viewable area 614 is maintained at a temperature that prevents the accumulation of moisture 612. For example, the temperature of the viewable area 614 may be maintained above a dewpoint of the ambient atmosphere. The FOV 124 of the sensor 122 in the sensor device 120 includes the viewable area 614.

In some implementations, sensor device 120 may include or may be coupled to a lens assembly 616. The sensor 122 or the lens assembly 616 may be placed close to the heated window 436 to minimize the size of the viewable area 614 needed to accommodate the FOV 124. For example, where the sensor 122 comprises a pinhole camera, the viewable area 614 may be quite small compared to the viewable area of a sensor 122 that is coupled to a telephoto lens assembly 616. In some implementations, the heated window 436 may comprise at least a portion of the lens assembly 616. For example, an outermost portion of the lens assembly 616 may be the heated window 436, having one or more of the transparent heater elements.

One or more temperature sensors 122(14) may be placed within the shell 602, outside of the shell 602, and so forth. In the implementation depicted here, the temperature sensor 122(14) is placed on an interior side of the heated window 436 outside of the viewable area 614 at an unheated portion of the heated windows 436. In some implementations, the temperature sensor 122(14) may provide data indicative of temperature to the heater controller 434. The heater controller 434 may be configured to distribute energy to the one or more heater elements of the heated window 436 based at least in part on the temperature measured by the temperature sensor 122(14).

Figure 7:
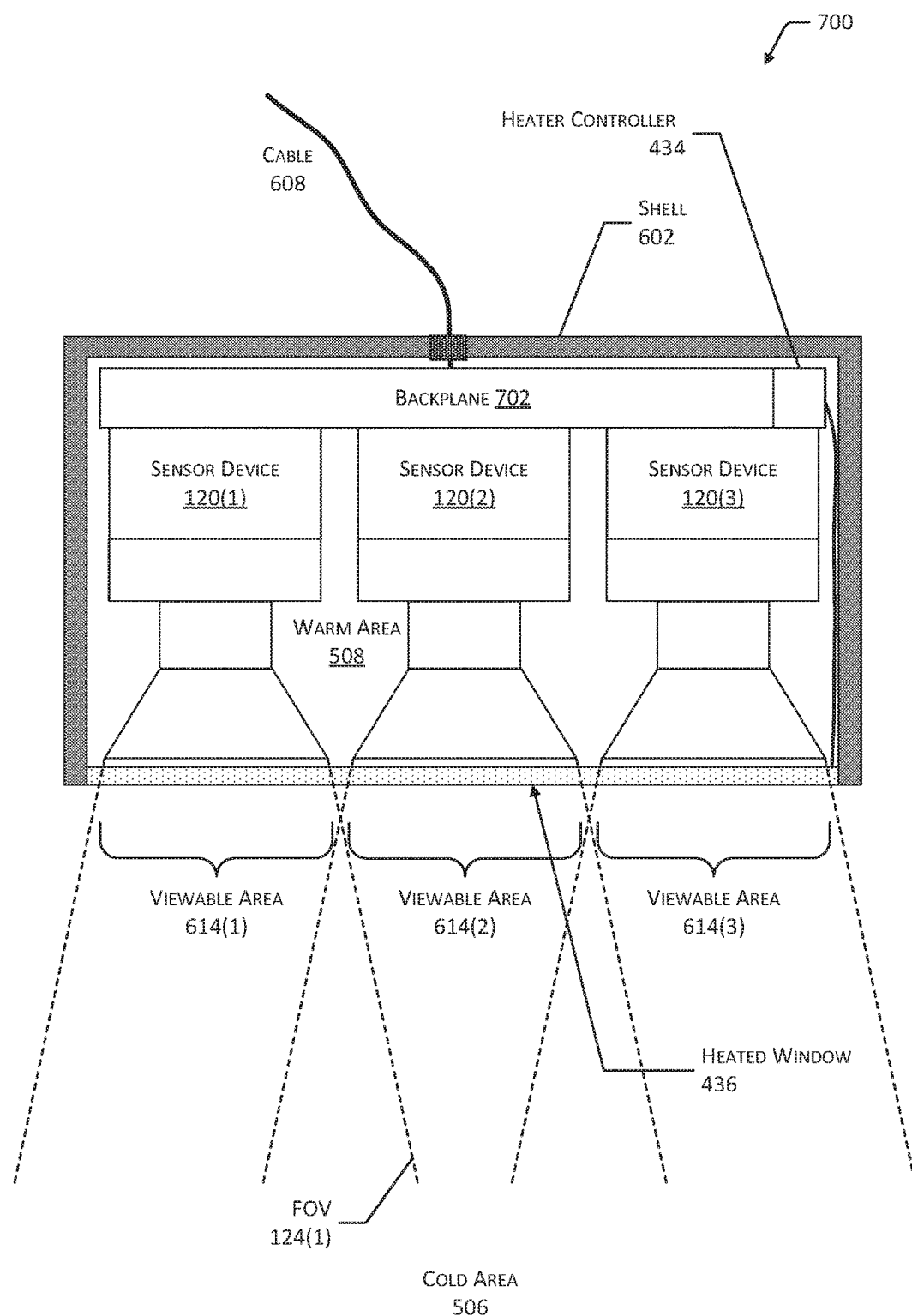
FIG. 7 illustrates an enclosure with a plurality of sensor devices inside and a heated window having a plurality of viewable areas, according to some implementations.

FIG. 7 illustrates a cross-sectional view 700 of an enclosure with a plurality of sensor devices 120 inside and a single heated window 436 having a plurality of viewable areas 614, according to some implementations. As depicted, the shell 602 includes three sensor devices 120(1), 120(2), and 120(3). While three sensor devices 120 are depicted, it is understood that a larger or smaller number of sensor devices 120, sensors 122, and so forth may be within a single shell 602. A single heated window 436 provides three viewable areas 614(1), 614(2), 614(3) that allow the FOV 124 of the respective sensors devices 120 to gather information from events outside of the enclosure 126.

A backplane 702 may provide a common mechanical, electrical, optical, or other interconnects between the cable 608 and the sensor devices 120. The heater controller 434 for the enclosure 126 may be coupled to or part of the backplane 702.

Figure 8:
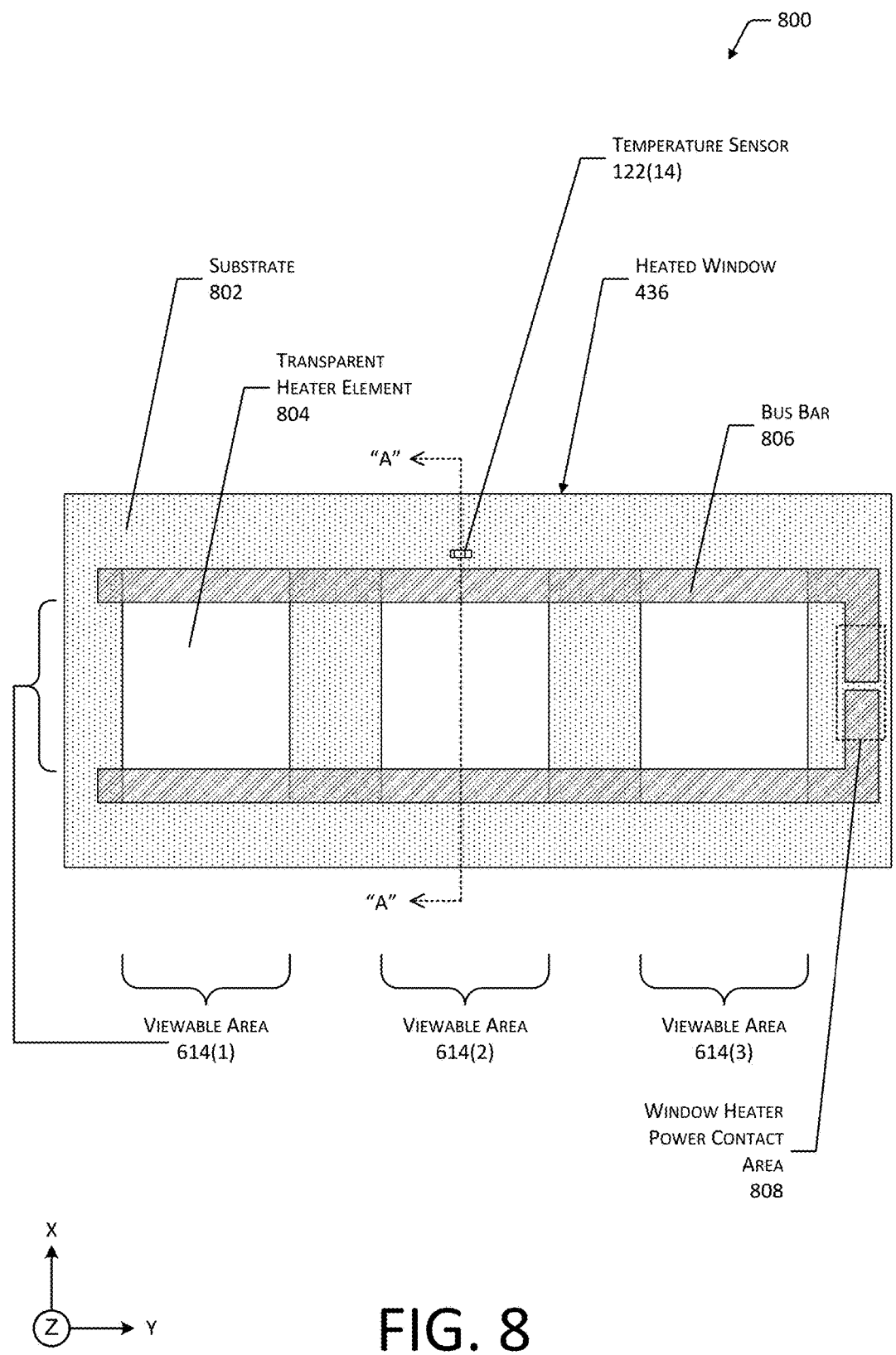
FIG. 8 illustrates a plan view of a heated window having a plurality of viewable areas, according to some implementations.

FIG. 8 illustrates a plan view 800 of a heated window 436 having a plurality of viewable areas 614, according to some implementations. For example, the enclosure 126 depicted in FIG. 7 may utilize the heated window 436 depicted here.

The heated window 436 comprises a substrate 802, one or more transparent heater elements 804, and one or more bus bars 806. Some implementations may also include one or more window heater power contact areas 808.

The substrate 802 may comprise one or more of an optically transparent glass, polymer, and so forth. For example, the substrate 802 may comprise acrylic, glass, polyethylene terephthalate (PET), polycarbonate, polyamide, and so forth. The substrate 802 may be an electrical insulator. The transmittance of the substrate 802 to light may be less than 100%. For example, the substrate 802 may comprise PET that transmits 70% of incident light that has a wavelength of 500 nanometers (nm). As described below with regard to the transparent heater elements 804, the transmissivity of the substrate 802 may be such that at least some of the light used by the sensor 122 is transmitted through the substrate 802. The substrate 802 may be a thermal insulator, or may have relatively poor thermal conductive properties. For example, the substrate 802 may comprise borosilicate glass.

In the implementation depicted, each viewable area 614 comprises a single transparent heater element 804. In this configuration, the FOV 124 passes through at least a portion of a single contiguous portion of the transparent heater element 804. The transparent heater element 804 may comprise a layer of optically transparent material arranged on the substrate 802. The material may be one or more of a transparent conducting oxide, a transparent conducting polymer, a carbon nanotube, and so forth. For example, the transparent heater element 804 may comprise indium tin oxide (ITO), aluminum doped zinc oxide (AZO), indium doped cadmium oxide, and so forth. The material of the transparent heater element 804 may be printed, deposited, laminated, or otherwise emplaced on or within the substrate 802. For example, chemical vapor deposition, epitaxy, thermal oxidation, physical vapor deposition, casting, and so forth may be used to place the transparent heater element 804 on the substrate 802.

The optically transparent material is deemed to be optically transparent when, as emplaced on the substrate 802, at least a portion of light that is incident on the optically transparent material is transmitted through. For example, a transparent heater element 804 that transmits 70% of incident light may be deemed to be optically transparent. Depending on the sensor 122, the transmissivity may be determined at different wavelengths. For example, when the heated window 436 is used with a visible light imaging sensor 122(1), the transmissivity may be measured at one or more visible light wavelengths, such as between 380 and 750 nanometers (nm). In another example, when the heated window 436 is used with an ultraviolet light imaging sensor 122(1) the transmissivity may be measured for light having wavelengths of between 100 and 380 nanometers.

The degree of optical transparency that is required may be specific to the application. For example, in an environment that may illuminated at a level that is greater than desired for acquisition by an image sensor 122(1), the desired optical transparency of the transparent heater element 804 may be lower, to allow the transparent heater element 804 to act as a shade or otherwise reduce the amount of light incident to avoid oversaturation of the image sensor 122(1). Continuing the example, in this situation the transmittance of the transparent heater element 804 may be 30% of incident light.

The transparent heater element 804 has a first end (or first terminal) and a second end (or second terminal). Electrical energy is delivered to the transparent heater element 804 at the first end and the second end by way of the bus bars 806. The bus bars 806 comprise an electrically conductive material. In some implementations, the electrically conductive material of the bus bars 806 may have electrical resistance per cross-sectional area that is less than that of the one or more transparent heater elements 804. For example, per square centimeter of cross-sectional area, the bus bars 806 may have a higher connectivity than the ITO. The bus bars 806 may comprise electrodeposited copper, silver paste, metals emplaced by way of chemical vapor deposition, epitaxy, thermal oxidation, physical vapor deposition, casting, and so forth.

As depicted here, the bus bars 806 are configured to distribute energy to all of the transparent heater elements 804 simultaneously. Relative to the bus bars 806, the transparent heater elements form an electrically parallel circuit. In other implementations, the transparent heater elements 804 may be independently addressable, such that the heater controller 434 may be able to selectively direct different amounts of electrical energy to a particular transparent heater element 804. For example, the transparent heater element 804 that services viewable area 614(1) may deliver more electrical energy than the transparent heater element 804 that services viewable area 614(2).

The bus bars 806 may receive electrical energy by way of one or more window heater power contact areas 808. The window heater power contact areas 808 may comprise patches or portions of the bus bar 806 to which one or more of the electrical conductors of the window heater power cable 610 may be affixed. For example, the electrical conductor of the window heater power cable 610 may be bonded to the window heater power contact area 808 using an anisotropic conductive film (ACF). In other examples, the electrical conductor of the window heater power cable 610 may be soldered, maintained in mechanical and electrical contact without bonding, and so forth.

In the implementation depicted here, the transparent heater element 804 is substantially homogenous in that delivery of heat per unit area is approximately the same for any given portion of the transparent heater element 804. The delivery of heat to the substrate 802 may be considered substantially uniform with this implementation. For example, the amount of electrical energy delivered as heat per unit time within a 1 mm$^2$ area at the center of the transparent heater element 804 may be substantially the same as that at a 1 mm$^2$ area at the edge of the same transparent heater element 804.

While the distribution of energy is substantially uniform, the temperature of the heated window 436 in the viewable area 614 associated with transparent heater element 804 may not be. As described below with regard to FIG. 10, different portions of the substrate 802 may transfer heat at different rates. As a result, in the implementation depicted in FIG. 8, during heating the temperature at the center of the transparent heater element 804 may be greater than the temperature at the edge of the transparent heater element 804.

Figure 9:
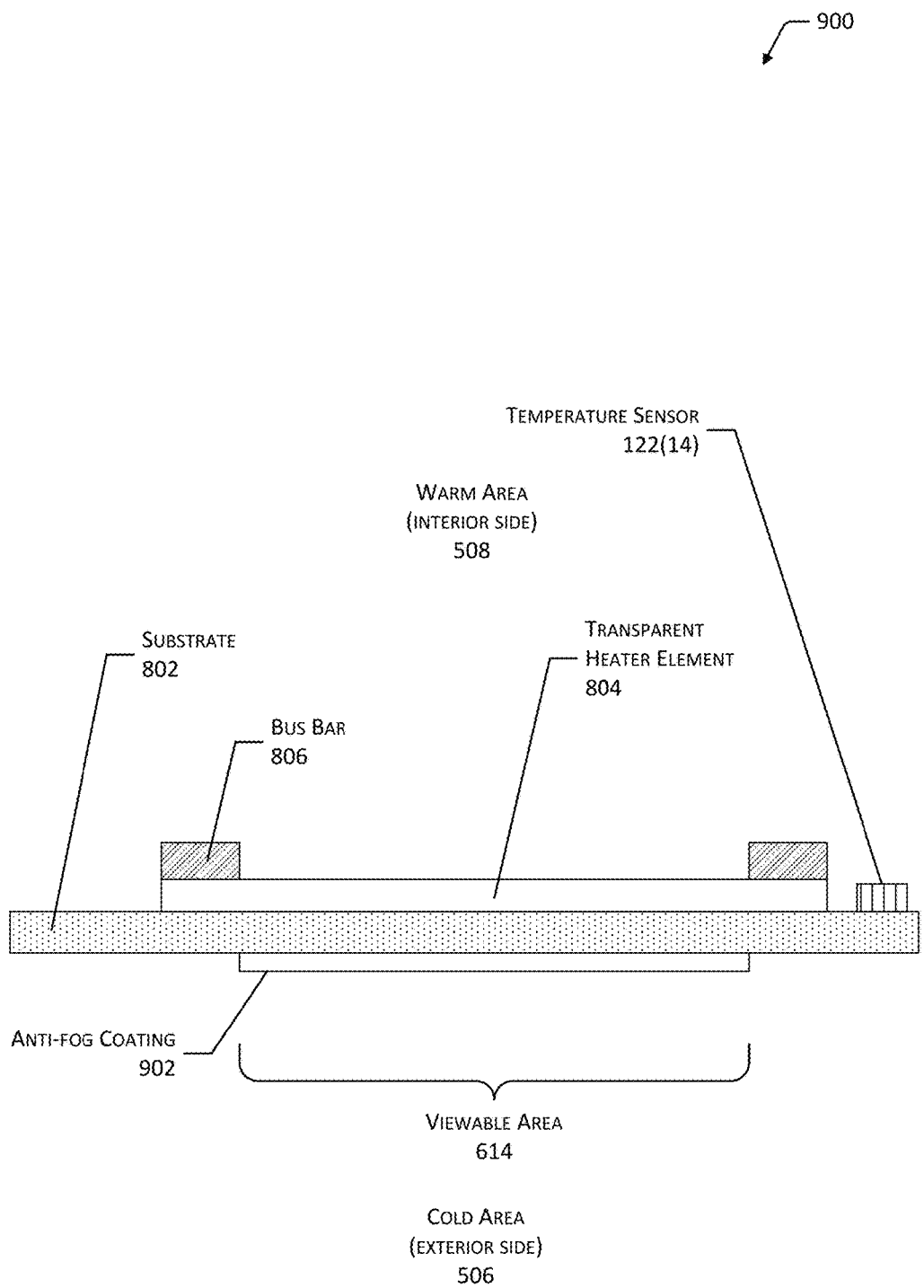
FIG. 9 illustrates a cross-sectional view of the heated window of FIG. 8, according to some implementations.

FIG. 9 illustrates a cross-sectional view 900 of the heated window 436 of FIG. 8 along line A-A, according to some implementations. In this view, the substrate 802 is depicted with the transparent heater element 804 placed atop the substrate 802. A bus bar 806 may be placed atop at least a portion of the transparent heater element 804. The placement of the bus bar 806 is such that the viewable area 614 is unobscured by the bus bar 806. As depicted, the transparent heater element 804 and the bus bar 806 may be located on an interior surface of the substrate 802, within the warm area 508. This arrangement minimizes the number of penetrations or pass-throughs in the shell 602 or the substrate, allowing for the window heater power cable 610 to remain within the shell 602.

In some implementations, one or more coatings, such as an anti-fog coating 902, may be placed on the exterior surface of the substrate 802 of the heated window 436. The exterior surface may be exposed to a higher relative humidity than the interior side of the substrate. The anti-fog coating 902 may be deposited across the entire surface of the substrate 802, or may be placed proximate to the viewable area 614. For example, those portions of the heated window 436 that are at least in part within the viewable area 614 and opposite of the transparent heater element 804 may have the anti-fog coating 902.

The anti-fog coating 902 may comprise a material that is hydrophilic. In some implementations, the anti-fog coating 902 may be deposited upon the substrate 802, or may comprise a separate sheet or material that is laminated or otherwise affixed to substrate 802.

Other coatings may be applied to the exterior surface of the substrate 802, such as anti-scratch or scratch resistant coatings, antireflective coatings, antistatic coatings, and so forth.

Also depicted, is the temperature sensor 122(14) on the interior side of the substrate 802. For example, the temperature sensor 122(14) may comprise a semiconductor thermocouple. In other implementations, the temperature sensor 122(14) may comprise an optical detector, such as an infrared photodiode that has a FOV 124 including a least a portion of the viewable area 614. In other implementations the temperature sensor 122(14) may be placed elsewhere inside the enclosure 126, on the outside of the enclosure 126, or at other locations.

In some implementations a portion of the substrate 802 may be left unheated, and a temperature sensor 122(14) may be arranged therein to provide temperature data. For example, a "dummy" transparent heater element 804 may be deposited on the substrate 802 but may be configured to not receive power from any of the bus bars 806. The temperature sensor 122(14) may be located at or proximate to the center of this "dummy" transparent heater element 804. In some implementations, to facilitate acquisition of temperature data, delivery of power may be discontinued to a particular transparent heater element 804, allowing the transparent heater element 804 to cool. The temperature sensor 122(14) may provide temperature data indicative of the cooled portion of the window.

The transparent heater element 804 may be used as a temperature sensor 122(14) in some configurations. For example, the resistance of the transparent heater element 804 may vary in a known way based on temperature. The resistance of the transparent heater element 804 may be measured and used to determine the temperature.

A protective or sealant layer may be applied atop one or more of the bus bar 806, the transparent heater element 804, and so forth. For example, a PET film may be applied.

Figure 10:
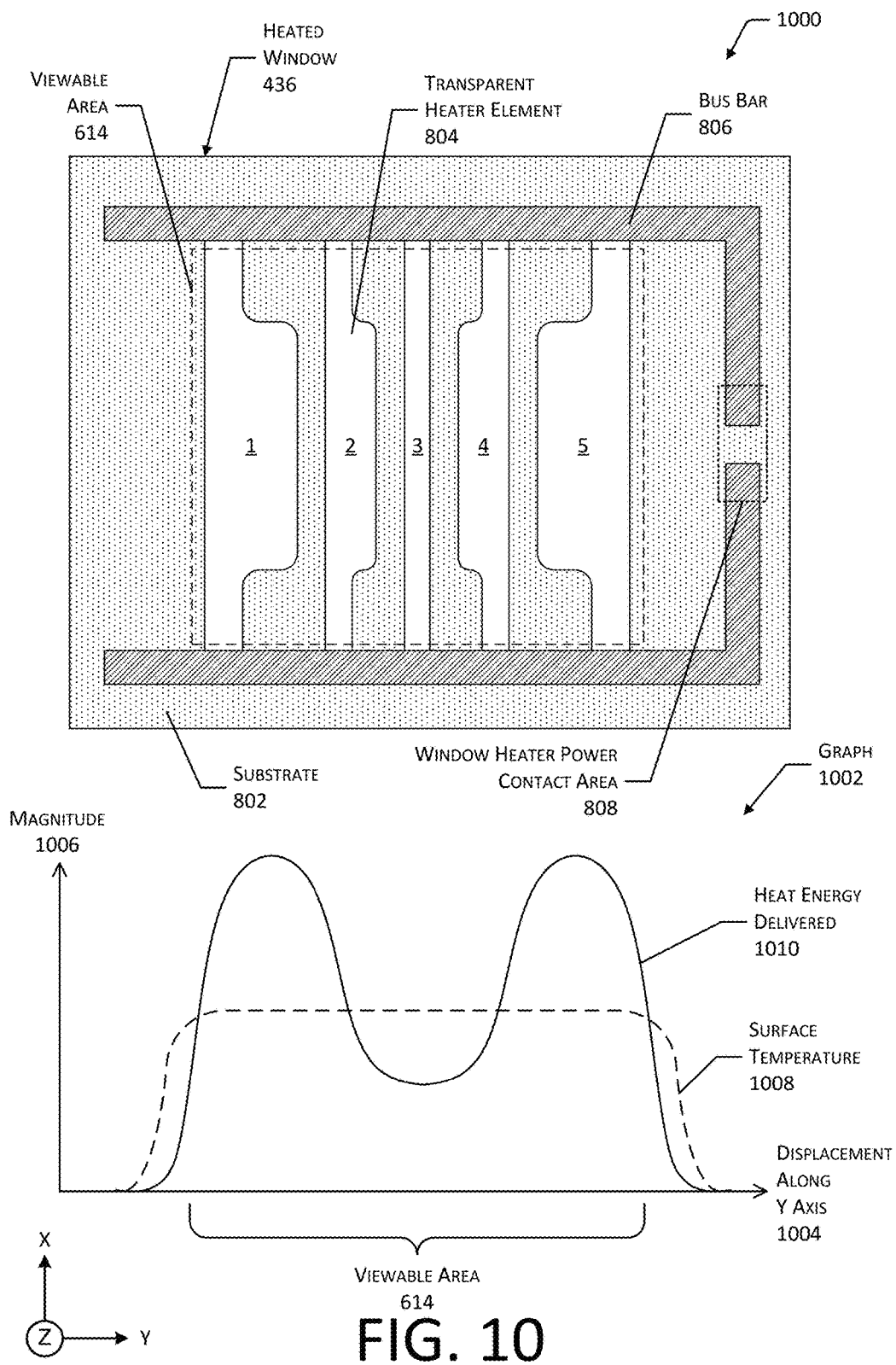
FIG. 10 illustrates a plan view of a heated window having a plurality of transparent heater elements to provide a non-uniform delivery of heat, according to some implementations.

FIG. 10 illustrates a plan view 1000 of a heated window 436 having a plurality of transparent heater elements 804 to provide a non-uniform delivery of heat, according to some implementations. At least a portion of the transparent heater elements 804 are within at least a portion of the viewable area 614.

The arrangement of transparent heater elements 804 as described above with regard to FIG. 8 may result in non-uniform temperatures across the viewable area 614 during heating. The non-uniform temperatures may result from differences in heat transfer due to conductive effects of the substrate 802 as it comes in contact with the shell 602. For example, heat may more easily flow from the substrate 802 in the perimeter of the viewable area 614 to the shell 602. As a result, uniform distribution of heat energy may result in non-uniform temperatures across the viewable area 614.

The non-uniform temperature may be considered to be an inefficient use of the energy provided to the transparent heater elements 804. For example, where the temperature of the substrate 802 is greater than a desired temperature, such as a dewpoint, more energy is being expended that is necessary to maintain the viewable area 614 to be clear of moisture 612. In effect, more energy is expended than needed to keep a particular portion of the viewable area 614, such as a central area, clear of moisture 612.

The arrangement depicted in FIG. 10 allows for a non-uniform distribution of energy that provides a more uniform temperature across the viewable area 614. As a result, hotspots within the viewable area 614 are avoided. This may allow the use of substrate 802 materials that have a lower melting point, reduces overall energy consumption both in the heating of the heated window 436 and in the refrigeration to remove that heat, and so forth.

FIG. 10 depicts one arrangement of a plurality of transparent heater elements 804(1)-(5) for a particular viewable area 614. As described above, the transparent heater elements 804 are coupled to a bus bar 806 to receive electrical energy. The bus bar 806 may include a window heater power contact area 808 for coupling to the window heater power cable 610. While the bus bar 806 is shown delivering power to each of the transparent heater elements 804(1)-(5) in parallel, in some implementations, the bus bar 806 may implement a series electrical circuit, or may be independently addressable such that a particular transparent heater element 804 may have a particular amount of energy delivered that is different from that of another transparent heater element 804.

The surface area for each of the transparent heater elements 804(1)-(5) vary from one to another. For example, the transparent heater element 804(3) has less surface area than the transparent heater element 804(2). Surface area of the transparent heater elements 804 may affect the power dissipation of the respective elements. During operation, the different transparent heater elements 804 may have different power dissipation ratings. For example, the transparent heater element 804(1) may dissipate as heat 3 watts of electrical power during operation while the transparent heater element 804(3) may dissipate as heat 1 watt of electrical power. The heat from the transparent heater element 804 may be transferred to the surrounding environment via radiation, conduction, convection, and so forth. For example, some of the 3 watts of the heat dissipated by the transparent heater element 804(1) may be emitted as infrared radiation, may be transferred by conduction through the substrate 802, may warm the surrounding air, and so forth. The shape of the particular transparent heater elements 804 in this arrangement are discussed below in more detail with regard to FIG. 11.

By varying the size of the transparent heater element 804, different densities of heat distribution per unit area may be produced. For example, the least heat per unit area may be applied to the center of the viewable area 614 using the transparent heater element 804(3). In comparison, the transparent heater element 804(1) has a "bulge" or a larger middle that delivers heat energy to the midline of the perimeter, while a narrower neck delivers relatively less heat energy to a corner.

A graph 1002 illustrates heat delivery and surface temperature. A first axis 1004 indicates displacement "left to right" along the Y axis of the heated window 436. A second axis 1006 orthogonal to the first axis 1004 depicts a magnitude. A dotted line indicates surface temperature 1008 of the substrate 802. A solid line indicates the heat energy delivered 1010 using the plurality of transparent heater elements 804 within at least a portion of the viewable area 614. For example, the solid line may be indicative of a power density of a particular portion of the heated window 436.

As depicted here, more heat energy is delivered to the left and right edges of the viewable area 614 than the center. For example, transparent heater elements 804(1) and 804(5) are delivering more heat energy to the substrate 802 then the transparent heater element 804(3) located in the center. However, as described above, due to how heat is transferred between the substrate 802 and other objects such as the shell 602, the surface temperature 1008 of the substrate 802 is predominantly the same across the viewable area 614. Unlike the configuration described above with regard to FIG. 8, there is no hotspot of increased temperature towards the center of the viewable area 614.

Figure 11:
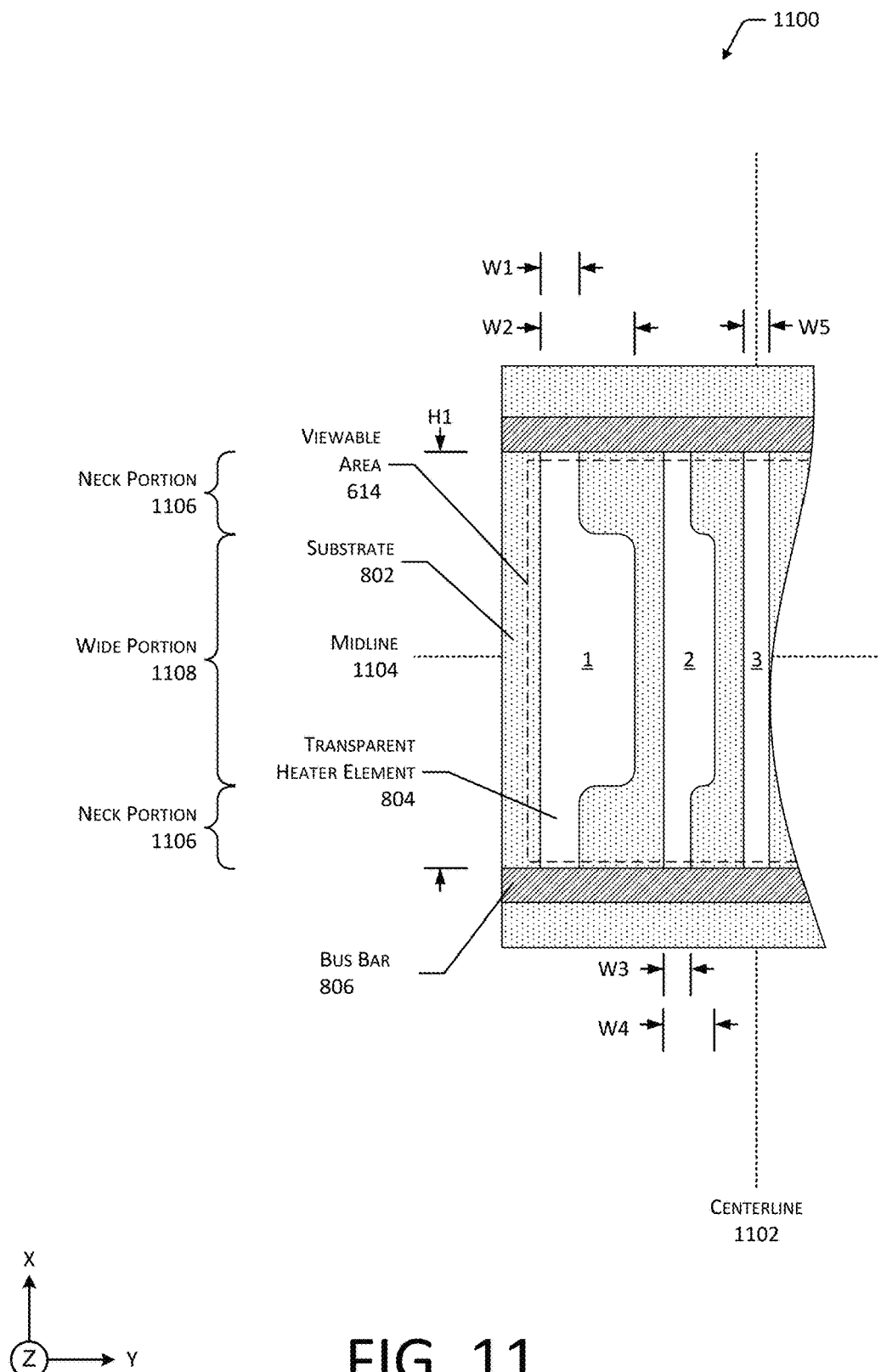
FIG. 11 illustrates an enlarged plan view of a heated window having a plurality of transparent heater elements to provide a non-uniform delivery of heat, according to some implementations.

FIG. 11 illustrates an enlarged plan view 1100 of a portion of the heated window 436 of FIG. 10, according to some implementations.

The viewable area 614 may be considered to have a centerline 1102 and a midline 1104. The centerline 1102 and the midline 1104 may be visualized as perpendicular to one another with a point of intersection that corresponds to a center point of the viewable area 614.

At least some of the transparent heater elements 804 may exhibit a non-uniform or regular shape as arranged on the substrate 802. For example, the transparent heater elements 804(1), 804(2), 804(4), and 804(5) have a "bulge" or extended section. In comparison, the transparent heater element 804(3) is rectangular in shape.

The transparent heater elements 804 may have one or more neck portions 1106 and one or more wide portions 1108 located between the first end and the second end of the transparent heater element 804. The transparent heater elements 804 may have a common height H1. However, different portions of different transparent heater elements 804 may vary. For example, for the transparent heater element 804(1) neck portions 1106 have a first width W1 that is less than a second width W2 in the wide portion 1108. Similarly, the transparent heater element 804(2) has a width W3 in the neck portions 1106 that is less than a width W4 of the wide portion 1108. The overall electrical resistance of one transparent heater element 804 may differ from another. For example, a first resistance measured across a first end or first terminal and a second end or second terminal of the transparent heater element 804(1) may differ from that of the resistance measured across a first end or first terminal and a second end or second terminal of the transparent heater element 804(2).

In comparison, the width W5 of the transparent heater element 804(3) that is positioned along the centerline 1102 is less than the widths W2 and W4. Because of the different amounts of surface area and the shape of the transparent heater element 804, a non-uniform delivery of heat may be provided to the viewable area 614 of the heated window 436.

As described above, the heater controller 434 may use information from one or more temperature sensors 122(14) to deliver electrical power to the transparent heater elements 804(1)-(5) responsive to the temperature.

Figure 12:
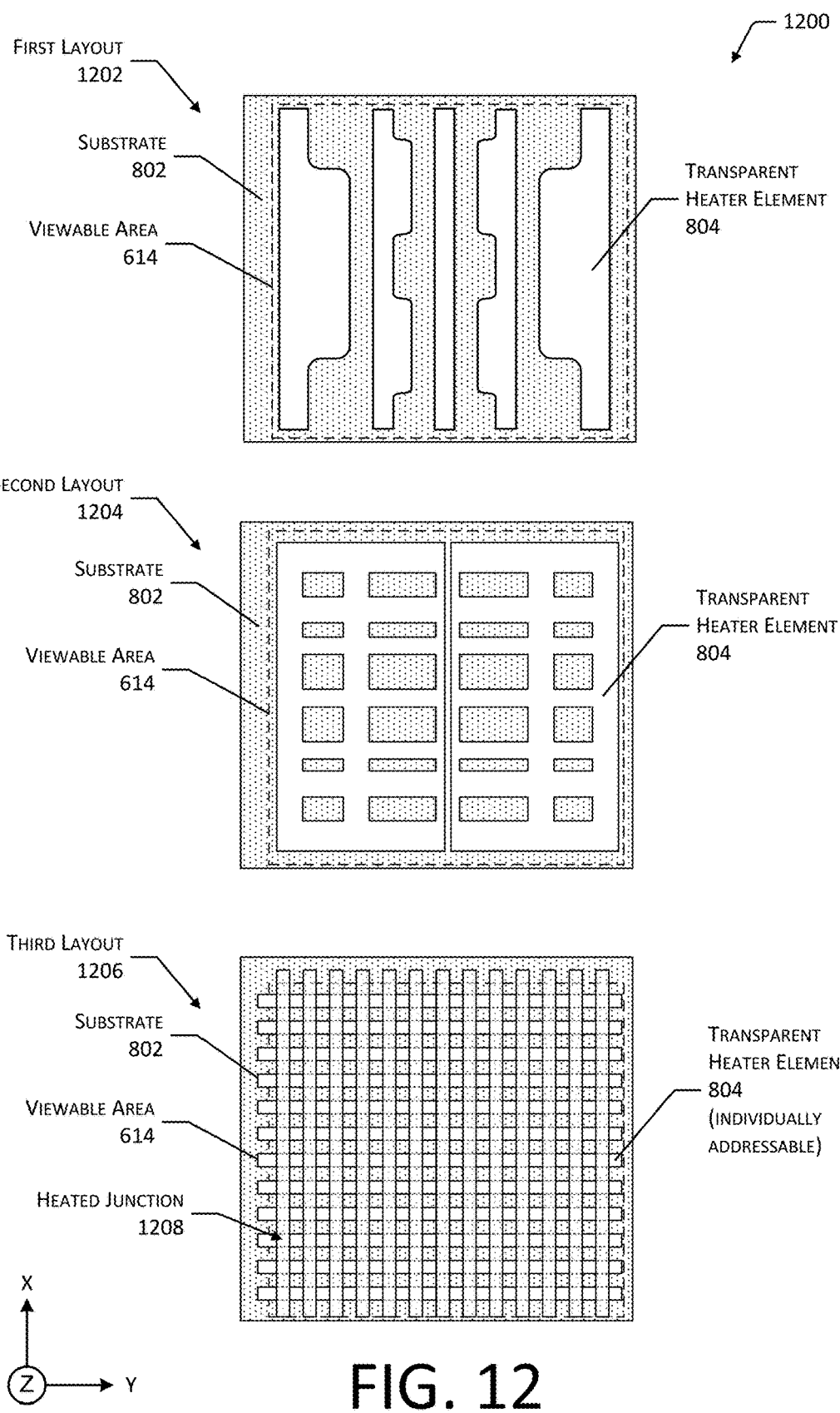
FIG. 12 illustrates various layouts of transparent heater elements to provide a non-uniform delivery of heat, according to some implementations.

FIG. 12 illustrates various layouts 1200 of transparent heater elements 804 to provide a non-uniform delivery of heat, according to some implementations. These layouts are presented by way of illustration and not necessarily as a limitation.

A first layout 1202 depicts an arrangement of the transparent heater elements 804.

A second layout 1204 depicts another arrangement of the transparent heater elements 804. In this arrangement, there is a left transparent heater element 804 and a right transparent heater element 804. Electrical energy may be delivered to one or both, to allow for selective clearance of moisture 612. For example, the left side of the FOV 124 may be deemed to be unnecessary to collect sensor data 132. As a result, the heater controller 434 may deactivate the left transparent heater element 804 and provide electrical power to the right transparent heater element 804.

A third layout 1206 depicts yet another arrangement of the transparent heater elements 804. With this arrangement, the heater controller 434 may be able to apply electrical energy to a particular combination of row(s) and column(s) of the transparent heater elements 804. Each of these transparent heater elements 804 may be independently addressable, such that power may be applied to a particular transparent heater element 804. When electrical energy is applied, a heated junction 1208 occurs at the intersection and along the respective row(s) and column(s) that is energized. For example, a particular subsection or portion of the transparent heater elements 804 may be used to heat particular portions of the viewable area 614.

In each of these layouts, at least a portion of the transparent heater elements 804 are within the viewable area 614. Energy is provided by the heater controller 434 to be distributed as heat from the transparent heater elements 804 in a non-uniform fashion. As a result, uniform heat distribution across the viewable area 614 may be provided. The distribution may be considered uniform along one dimension or along two dimensions. For example, the distribution may be deemed to be uniform when there is a less than 10% variation from left to right. In another example, the distribution may be deemed to be uniform when there is less than a 5% variation from one subsection of the viewable area 614 to another.

The shape, distribution, or both shape and distribution of the transparent heater elements 804 may vary to provide different viewable areas 614. For example, a first pattern of the transparent heater elements 804 may be used at the viewable areas 614 at the ends of a single heated window 436 in the enclosure 126, while a second pattern may be used at the viewable area 614 in the middle of the heated window 436. The shape of the transparent heater elements 804 may be asymmetrical.

Figure 13:
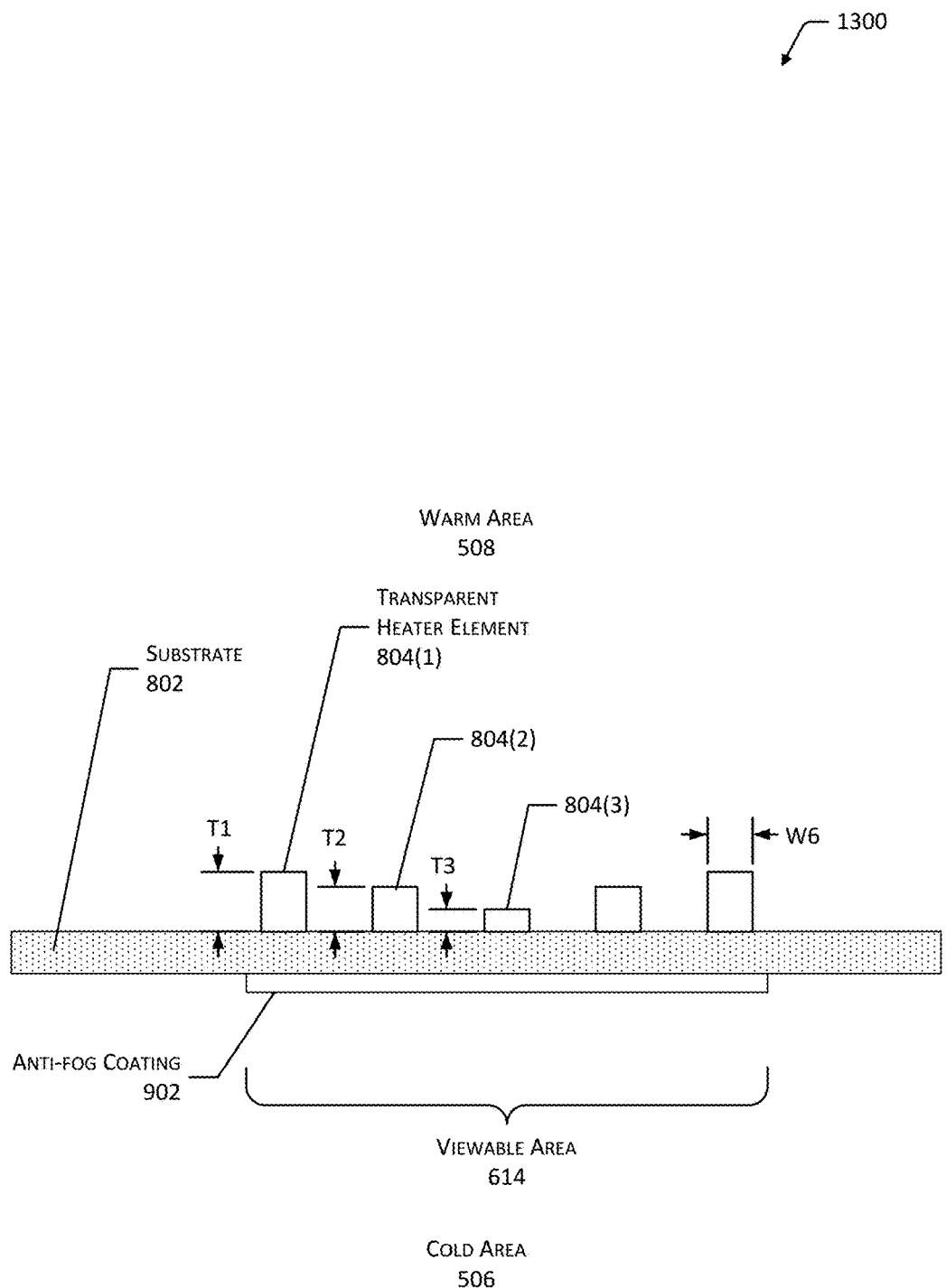
FIG. 13 illustrates a cross-sectional view of a heated window in which the thickness of the transparent heater elements varies to provide a non-uniform delivery of heat, according to some implementations.

FIG. 13 illustrates a cross-sectional view 1300 of a heated window 436 in which the thickness of the transparent heater elements 804 varies to provide a non-uniform delivery of heat, according to some implementations.

Instead of, or in addition to, the changes in surface area depicted above with regard to FIGS. 10-12, in some implementations, the thickness of the transparent heater element 804 may be varied to change the amount of energy distributed. For example, as depicted here transparent heater elements 804 have a common width of W6, but have different heights. The greater the height, the more energy may be delivered to the substrate 802 proximate to the transparent heater element 804. For example, the transparent heater element 804(1) has a thickness of T1 which is greater than the thickness T2 of transparent heater element 804(2). As a result, the transparent heater element 804(1) may deliver more energy to the substrate 802 than the transparent heater element 804(2). The transparent heater element 804(3) has a thickness T3 that is less than T2.

In other implementations, one or more characteristics of the transparent heater elements 804 may be varied to change the amount of energy distributed to a particular portion of the heated window 436. As described earlier, the surface area of a transparent heater element 804 may be varied to change the amount of power dissipated by that transparent heater element 804. As described here in FIG. 13, the thickness of the transparent heater element 804 may be varied to change the amount of power dissipated by that transparent heater element 804. The composition of the transparent heater element 804 may be varied to change the amount of power dissipated. For example, a concentration of dopants may be changed during the manufacture of the transparent heater elements 804 to produce higher or lower electrical resistance.

Figure 14:
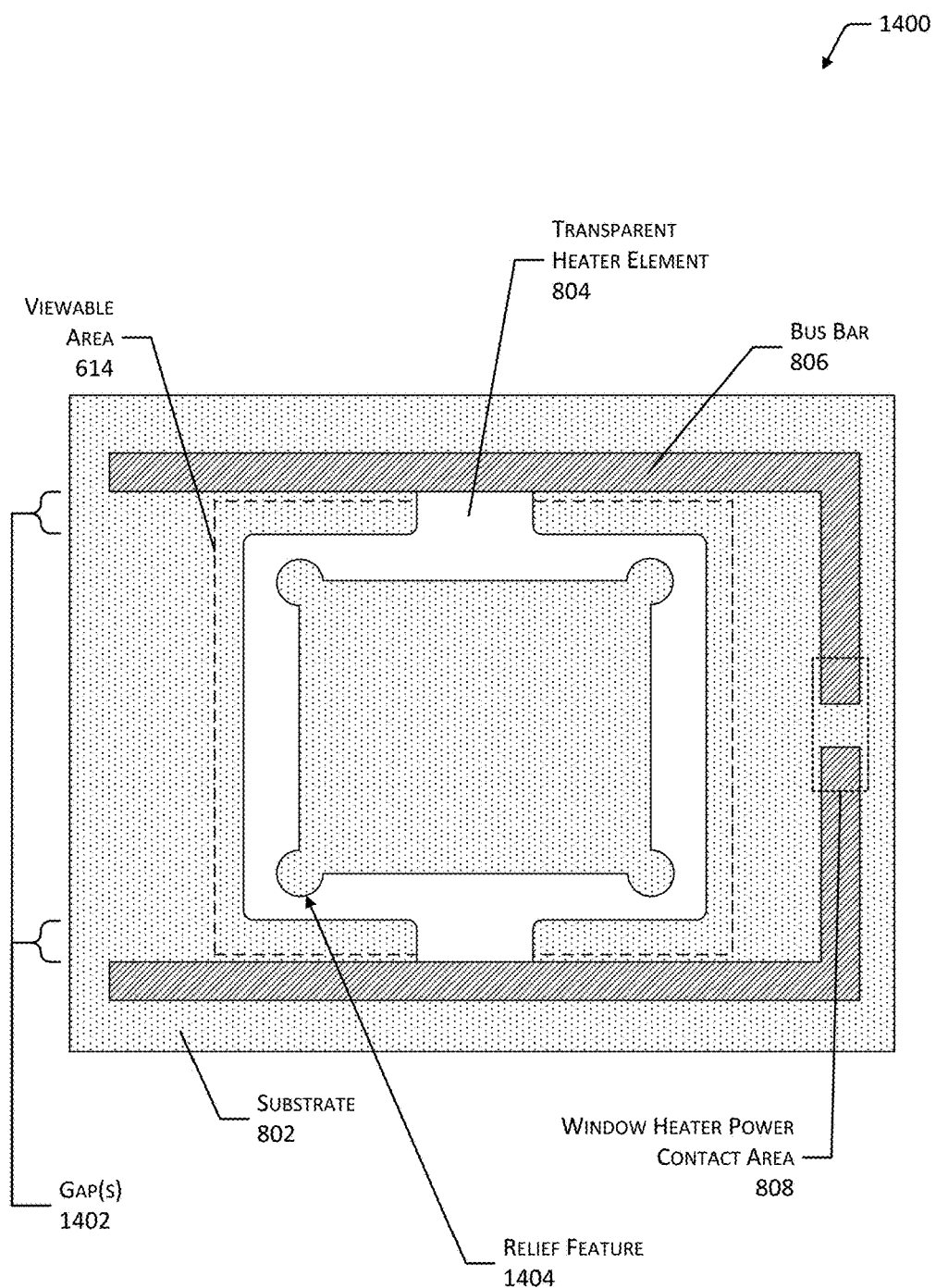
FIG. 14 illustrates a plan view of another layout of a transparent heater element, according to some implementations.

FIG. 14 illustrates a plan view 1400 of another layout of a transparent heater element 804, according to some implementations. In this illustration, a single transparent heater element 804 is arranged proximate to a perimeter of the viewable area 614. There may be a gap 1402 between the outermost edge of the transparent heater element 804 and the viewable area 614. One or more relief features 1404 such as semicircular cutouts may be present in the transparent heater element 804. These relief features 1404 may be used to control the heat buildup and avoid hotspots in the substrate 802 proximate to the corners of the transparent heater element 804.

Figure 15:
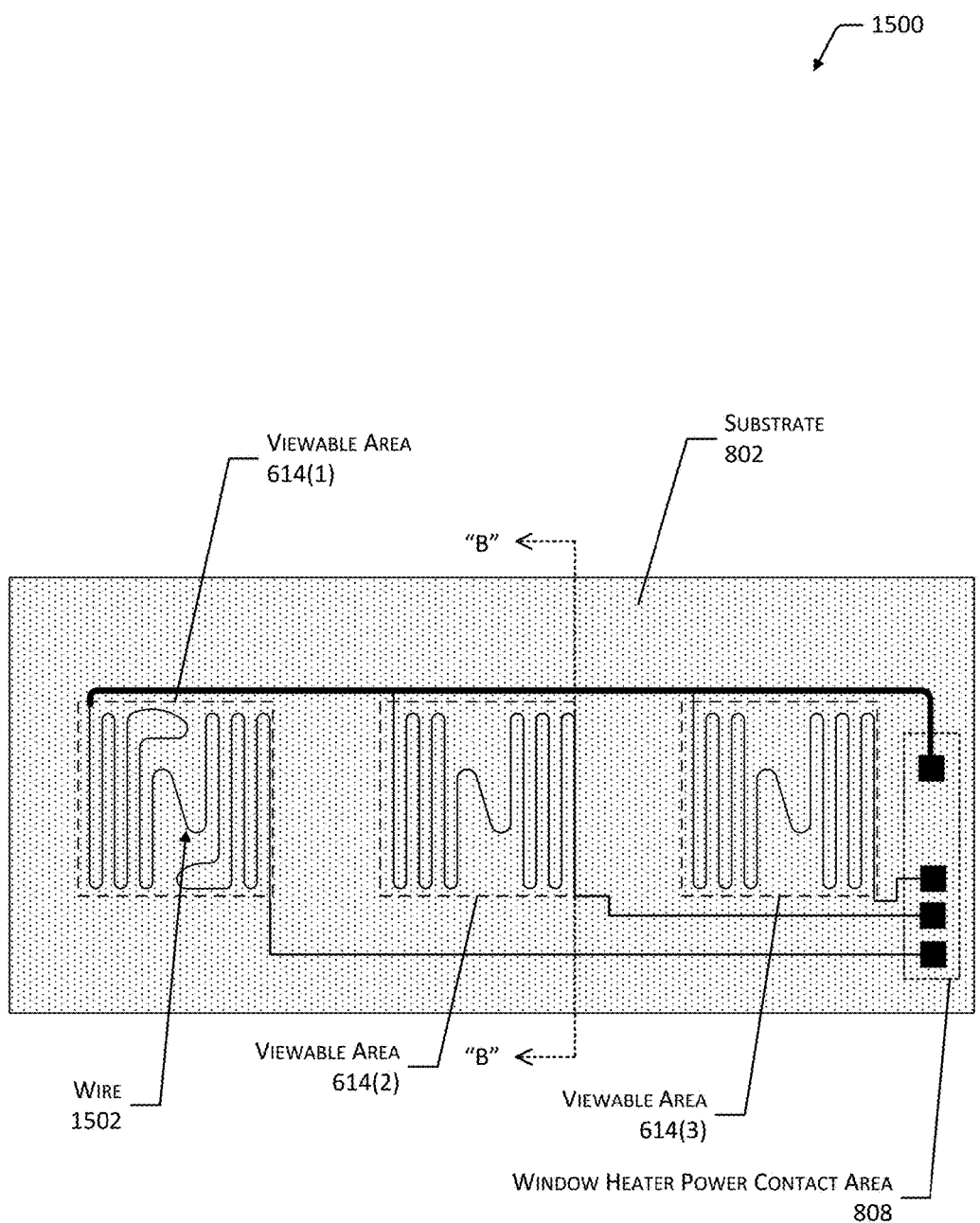
FIG. 15 illustrates a plan view of a heater element using wires to provide a non-uniform delivery of heat, according to some implementations.

FIG. 15 illustrates a plan view 1500 of a heater element using wires to provide a non-uniform delivery of heat, according to some implementations.

The heater element used in the heated window 436 may comprise material that is not optically transparent. For example, one or more wires 1502 may be used instead of or in addition to the transparent heater element 804. The wires 1502 may be opaque to the wavelengths used by the sensor 122. For example, the wires 1502 may comprise copper.

The wire 1502 may be embedded within the substrate 802, arranged atop the substrate 802, deposited onto, laminated to, printed upon, and so forth. The wire 1502 may have a maximum width or diameter that is such that it will not interfere with the operation of the sensor 122 even while in the FOV 124. For example, the wire 1502 may have a diameter of less than 30 microns. To minimize impact on the view of the sensor 122, a minimum spacing between an adjacent wire 1502 may also be specified. For example, a minimum spacing between two wires 1502 or a loop of the same wire 1502 may be specified as 0.5 mm. The maximum width and the minimum spacing may be determined based at least in part on the distance between the wires 1502 and the sensor 122, the nature of the sensor 122, the resolution of the sensor 122, and so forth. For example, a smaller maximum width may be specified for a high-resolution imaging sensor 122(1) than for a low resolution imaging sensor 122(1).

The wire 1502 may describe a pattern within the viewable area 614. In some implementations the pattern may be irregular or non-uniform with respect to the length of wire per surface area. For example, as depicted here, a central region of the viewable area 614 has less wire per unit area than around the perimeter of the viewable area 614. As described above, the arrangement of the wire 1502 may be set to provide a non-uniform distribution of heat and to assist in maintaining a relatively uniform temperature across the viewable area 614 during operation. In this illustration, the pattern of the heater elements varies between the viewable areas 614. For example, the pattern of wire 1502 in the viewable area 614(1) includes additional loops to distribute heat above and below the central region, compared to the pattern of the viewable area 614(2) and 614(3).

The wire 1502 may be maintained at a close distance relative to an input aperture of the sensor 122. For example, the one or more wires 1502 on the substrate 802 may be maintained at a distance of within 20 mm of a lens of the sensor 122 that serves as the input aperture of the sensor 122. In another example, the substrate 802 may be maintained at a distance of less than or equal to 20 mm of a pinhole when the sensor 122 is a pinhole camera.

As described above, the heater elements, such as the transparent heater elements 804 or the wires 1502, may be independently addressable. When independently addressable, a particular heater element or set of heater elements may receive an amount of electrical energy that differs from another. For example, in this illustration the wires 1502 of the viewable area 614(1) may receive more energy than viewable area 614(2). In other implementations, a plurality of heater elements may be arranged within the viewable area 614, and each of that plurality may be independently addressable. For example, a particular portion of the viewable area 614 may be heated by energizing the heater elements in that portion while another portion may be left unheated.

Figure 16:
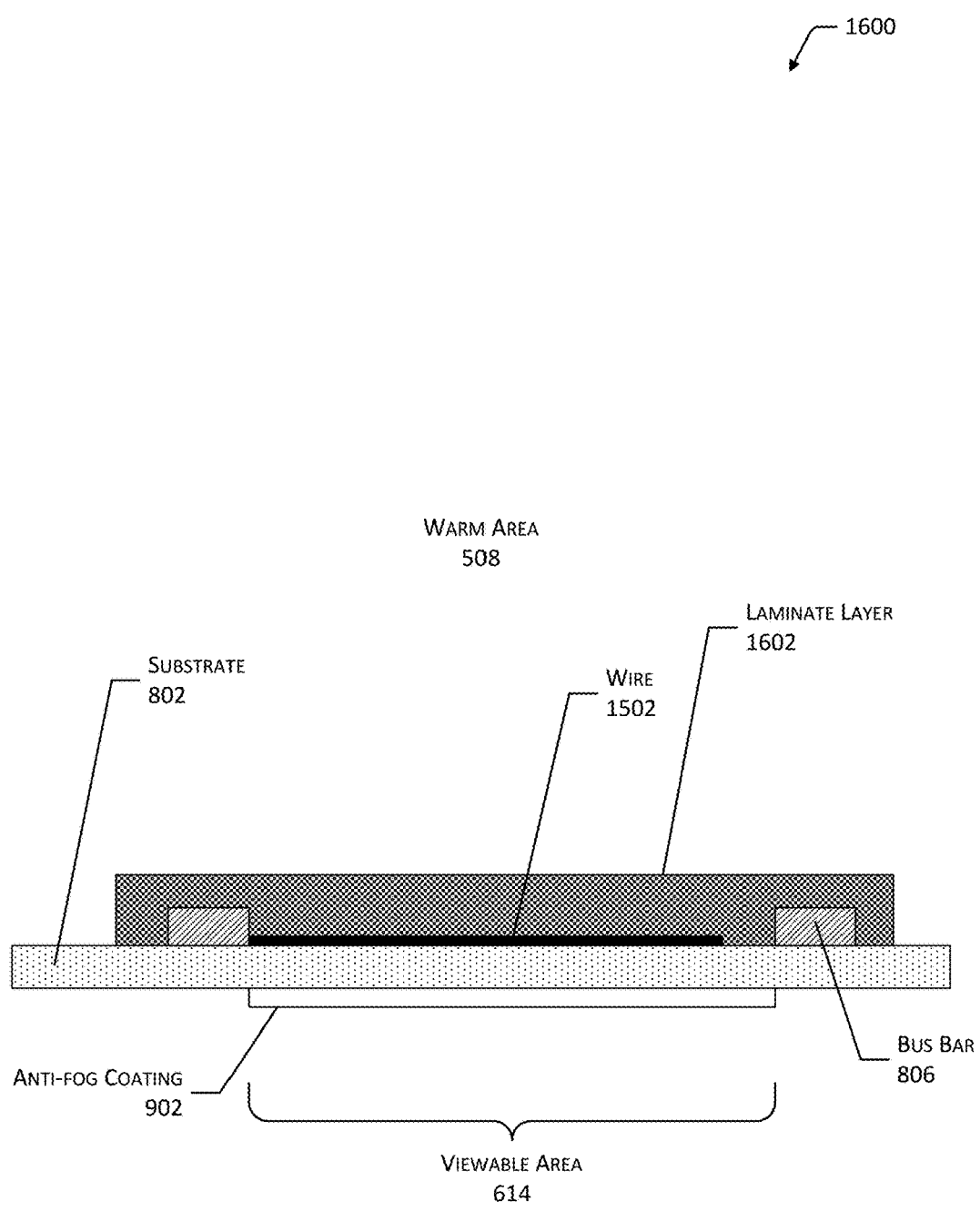
FIG. 16 illustrates a cross-sectional view of a heated window using wires to provide a non-uniform delivery of heat, according to some implementations.

FIG. 16 illustrates a cross-sectional view 1600 of the heated window 436 of FIG. 15 along line B-B. The heated window 436 in this illustration uses wires 1502 to provide a non-uniform delivery of heat, according to some implementations. The wires 1502 may be supported on, or embedded within, the substrate 802. A first end of the wire 1502 may couple to the first bus bar 806 as shown in this cross section. The other end of the wire 1502 may couple to the second bus bar 806 at another location on the substrate 802.

In some implementations, a protective of laminate layer 1602 may be placed atop the wire 1502. The laminate layer 1602 may be laminated to the substrate 802 and may serve to retain the wires 1502 proximate to the substrate 802 in a particular layout or pattern. As described above, an anti-fog coating 902 may be employed. In this illustration, the anti-fog coating overlaps the viewable area 614.

Figure 17:
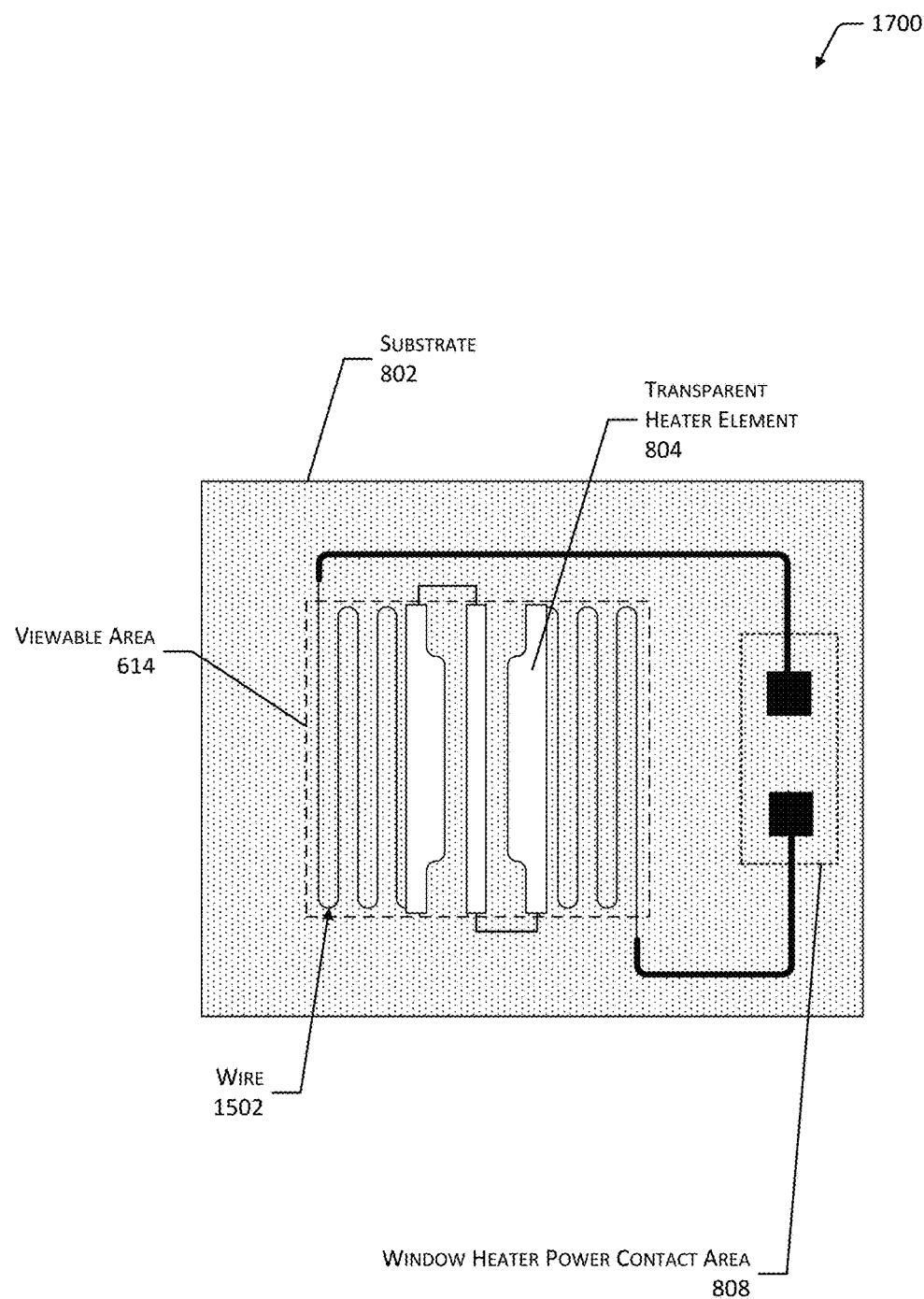
FIG. 17 illustrates a plan view of a hybrid heated window that includes a transparent heater element and a wire to provide a non-uniform delivery of heat, according to some implementations.
Figure 17:
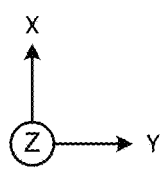

FIG. 17 illustrates a plan view 1700 of a hybrid heated window that utilizes transparent heater elements 804 and wires 1502 to provide a non-uniform delivery of heat, according to some implementations. A first portion of the viewable area 614 is heated using wires 1502, while another portion is heated using transparent heater elements 804.

The devices discussed herein may be implemented in various forms, at various sizes, using different proportions, and so forth. The descriptions are provided by way of illustration, and not necessarily as a limitation. Those having ordinary skill in the art readily recognize other implementations of the devices described herein.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments of processes may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the devices, structures, techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
an enclosure located within a refrigerated area and having an interior and an exterior;
a window of the enclosure having a first viewable area and a second viewable area, wherein the window acts as a barrier between the interior and the exterior of the enclosure;
a first camera and a second camera within the enclosure, the first camera proximate to the first viewable area and positioned to receive light in a first field of view that passes through the first viewable area of the window, the second camera proximate to the second viewable area and positioned to receive light in a second field of view that passes through the second viewable area of the window, the window comprising:
a substrate having an interior side and an exterior side, wherein the substrate is transmissive to at least a portion of incident light having a wavelength detectable by the first and second cameras;
arranged on the interior side of the substrate:
a first transparent heater element having a first shape and formed from indium tin oxide, wherein:
the first transparent heater element covers at least a portion of the first viewable area and has a first end and a second end,
the first field of view of the first camera passes through at least a portion of the first transparent heater element, and
the first shape of the first transparent heater element helps maintain a temperature of the first viewable area within a desired range; and
a second transparent heater element, wherein:
the second transparent heater element covers at least a portion of the second viewable area, and
the second field of view of the second camera passes through at least a portion of the second transparent heater element; and
a heater controller electrically connected to the first transparent heater element by a flexible printed circuit.

2. The system of claim 1, wherein:
the second transparent heater element is formed from indium tin oxide.

3. The system of claim 1, further comprising:
a first window heater power contact area;
a second window heater power contact area;
a first electrical conductor providing a conductive pathway between the first end of the first transparent heater element and the first window heater power contact area;
a second electrical conductor providing a conductive pathway between the second end of the first transparent heater element and the second window heater power contact area; and
the flexible printed circuit comprising:
the first electrical conductor bonded to the first window heater power contact area with an anisotropic conductive film; and
the second electrical conductor bonded to the second window heater power contact area with an anisotropic conductive film.

4. The system of claim 1, further comprising:
a temperature sensor to generate temperature data, wherein the temperature sensor is arranged on the interior side of the substrate; and
wherein the heater controller delivers electrical power to the first transparent heater element based at least in part on the temperature data.

5. The system of claim 1, further comprising:
a hydrophilic anti-fog coating arranged on the exterior side of the substrate, wherein the exterior side is exposed to a lower temperature than the interior side of the substrate.

6. A system comprising:
an enclosure located within a refrigerated area;
a first camera within the enclosure;
a second camera within the enclosure;
a window mounted to the enclosure, the window comprising:
a substrate having an interior side;
one or more heater elements on the interior side of the substrate, each of the one or more heater elements having a first terminal and a second terminal, wherein the one or more heater elements cover at least a portion of a first viewable area or a second viewable area on the substrate, and the one or more heater elements are configured to deliver heat non-uniformly to one or more of the first or second viewable areas; and wherein the first camera is proximate to the first viewable area and positioned to receive light through a first field of view that passes through the first viewable area and the second camera is positioned proximate to the second viewable area and positioned to receive light through a second field of view that passes through the second viewable area.

7. The system of claim 6, wherein the one or more heater elements are formed of optically transparent material deposited on the substrate, wherein the optically transparent material is one or more of a transparent conducting oxide, a transparent conducting polymer, or a carbon nanotube.

8. The system of claim 6, wherein the substrate comprises one or more of a glass or polymer that is an electrical insulator and is transmissive to one or more wavelengths that at least one or more of the first camera and the second camera can detect.

9. The system of claim 6, the one or more heater elements comprising:
one or more wires within at least a portion of the first or second viewable areas on the substrate, wherein the one or more wires have a diameter of less than 30 microns.

10. The system of claim 9, wherein the one or more wires are within 20 millimeters of one or more of a lens or a detector of at least one or more of the first camera or the second camera.

11. The system of claim 9, further comprising a polymer layer atop the one or more wires and laminated to the substrate.

12. The system of claim 6, further comprising:
a first window heater power contact area;
a second window heater power contact area;
a first electrically conductive element connecting the first terminal of the each of the one or more heater elements and the first window heater power contact area; and
a second electrically conductive element connecting the second terminal of the each of the one or more heater elements and the second window heater power contact area.

13. The system of claim 12, further comprising:
a flexible printed circuit comprising:
a first electrical conductor bonded to the first window heater power contact area with an anisotropic conductive film; and
a second electrical conductor bonded to the second window heater power contact area with an anisotropic conductive film.

14. The system of claim 12, wherein one or more of the first electrically conductive element or the second electrically conductive element comprise electrodeposited copper and have an electrical resistance per cross sectional area that is less than that of the one or more heater elements.

15. The system of claim 6, wherein the enclosure further comprises one or more layers of insulation.

16. The system of claim 6, further comprising an anti-fog coating on at least a portion of an exterior of the window.

17. The system of claim 6, further comprising:
a temperature sensor to generate temperature data indicative of a temperature of the window; and
a heater controller to provide electrical power to the one or more heater elements to maintain the one or more of the first or second viewable areas of the window at or below a dewpoint of an exterior environment.

18. A system comprising:
an enclosure located within a refrigerated area;
a window of the enclosure having a first viewable area and a second viewable area, the window comprising a substrate;
a first camera and a second camera within the enclosure, the first camera proximate to the first viewable area and positioned to receive light in a first field of view that passes through the first viewable area and the second camera proximate to the second viewable area and positioned to receive light in a second field of view that passes through the second viewable area;
one or more heater elements supported by the substrate, each of the one or more heater elements having a first terminal and a second terminal, wherein the one or more heater elements are within at least a portion of the first viewable area or the second viewable area on the substrate; and
a heater controller to provide electrical power to the one or more heater elements to maintain a temperature of one or more of the first viewable area or the second viewable area within a specified range.

19. The system of claim 18, wherein the specified range is between 0 degrees Celsius and a dewpoint of atmosphere exterior to the enclosure.

20. The system of claim 18, wherein the one or more heater elements comprise one or more wires embedded within the substrate, and further wherein the one or more wires that are within the first viewable area:
have a width of less than 30 microns,
a minimum spacing between an adjacent wire of 0.5 millimeters, and
are arranged in a non-uniform pattern.

21. The system of claim 18, wherein an input aperture of the first camera is less than 20 millimeters from the substrate.

* * * * *

UNITED STATES PATENT AND TRADEMARK OFFICE
CERTIFICATE OF CORRECTION

PATENT NO. : 10,365,671 B1  
APPLICATION NO. : 14/751033  
DATED : July 30, 2019  
INVENTOR(S) : Nelson et al.

Page 1 of 1

It is certified that error appears in the above-identified patent and that said Letters Patent is hereby corrected as shown below:

On the Title Page

Item (72), Inventors:  
Reads: DANIEL JOSEPH PETERS, Lynwood, WA  
Should read: DANIEL JOSEPH PETERS, Lynnwood, WA Signed and Sealed this  
Seventeenth Day of September, 2019

Andrei Iancu  
*Director of the United States Patent and Trademark Office*